US012681774B2

(12) United States Patent
Venkataraman et al.

(10) Patent No.: US 12,681,774 B2
(45) Date of Patent: Jul. 14, 2026

(54) CLOUD FITNESS ENGINEERING

(71) Applicant: Accenture Global Solutions Limited, Dublin (IE)

(72) Inventors: Mahesh Venkataraman, Bangalore (IN); Sundharraman Karthik Narain, Los Gatos, CA (US); Michael A. Ljung, Chicago, IL (US); Ajoy Menon, Bangalore (IN); Shylaja Shivaram, Bangalore (IN); David Edward Wood, El Segundo, CA (US); Reuben Rajan George, Enathu (IN)

(73) Assignee: Accenture Global Solutions Limited, Dublin (IE)

( * ) Notice: Subject to any disclaimer, the term of this patent is extended or adjusted under 35 U.S.C. 154(b) by 461 days.

(21) Appl. No.: 18/370,535

(22) Filed: Sep. 20, 2023

(65) Prior Publication Data

US 2024/0403135 A1    Dec. 5, 2024

Related U.S. Application Data

(60) Provisional application No. 63/469,743, filed on May 30, 2023.

(51) Int. Cl.
*G06F 9/50*        (2006.01)
*G06F 9/455*      (2018.01)

(52) U.S. Cl.
CPC ........ *G06F 9/5077* (2013.01); *G06F 9/45558* (2013.01); *G06F 2009/4557* (2013.01)

(58) Field of Classification Search
CPC .............. G06F 9/5077; G06F 9/45558; G06F 2009/4557
See application file for complete search history.

(56) References Cited

U.S. PATENT DOCUMENTS

| | | | |
|---|---|---|---|
| 10,936,238 B2 | 3/2021 | Power et al. | |
| 11,424,989 B2 | 8/2022 | Jeuk et al. | |
| 11,675,520 B2 | 6/2023 | Karr | |
| 2014/0282525 A1* | 9/2014 | Sapuram ............. | G06F 9/45533 718/1 |
| 2017/0206217 A1 | 7/2017 | Deshpande et al. | |
| 2020/0311600 A1* | 10/2020 | Kulkarni .................. | G06N 3/09 |

(Continued)

*Primary Examiner* — Dong U Kim

(74) *Attorney, Agent, or Firm* — Seed Intellectual Property Law Group LLP

(57)        ABSTRACT

Methods, systems, and apparatus, including computer programs encoded on computer storage media, for generating a cloud-computing system architecture. In some implementations, target performance criteria associated with an application executable at least in part on a cloud-computing system is obtained. Target process parameters related to processes associated with the execution of the application are generating using machine-learning models from the target performance criteria. Simulations of the execution of the application on respective ones of candidate computing systems are performed. Each candidate computing system includes a corresponding sequence of multiple architecture components at least a portion of which represents components of the clouding computing system. At least one of the candidate computing systems is selected that satisfies the target process parameters. Instructions are provided for deploying the selected computing system for execution of the application.

20 Claims, 7 Drawing Sheets

(56)                 References Cited

U.S. PATENT DOCUMENTS

| | | | |
|---|---|---|---|
| 2021/0303164 A1 | 9/2021 | Grunwald et al. | |
| 2022/0019367 A1 | 1/2022 | Freilich et al. | |
| 2022/0066760 A1* | 3/2022 | Chang | G06F 8/41 |
| 2022/0164327 A1* | 5/2022 | Zhu | G06F 16/217 |
| 2022/0413943 A1* | 12/2022 | Poornachandran | G06F 9/5088 |
| 2023/0168873 A1* | 6/2023 | Murai | G06N 20/00 |
| | | | 706/12 |
| 2024/0232039 A1* | 7/2024 | Isaac | G06N 20/00 |

* cited by examiner

Figure 3:
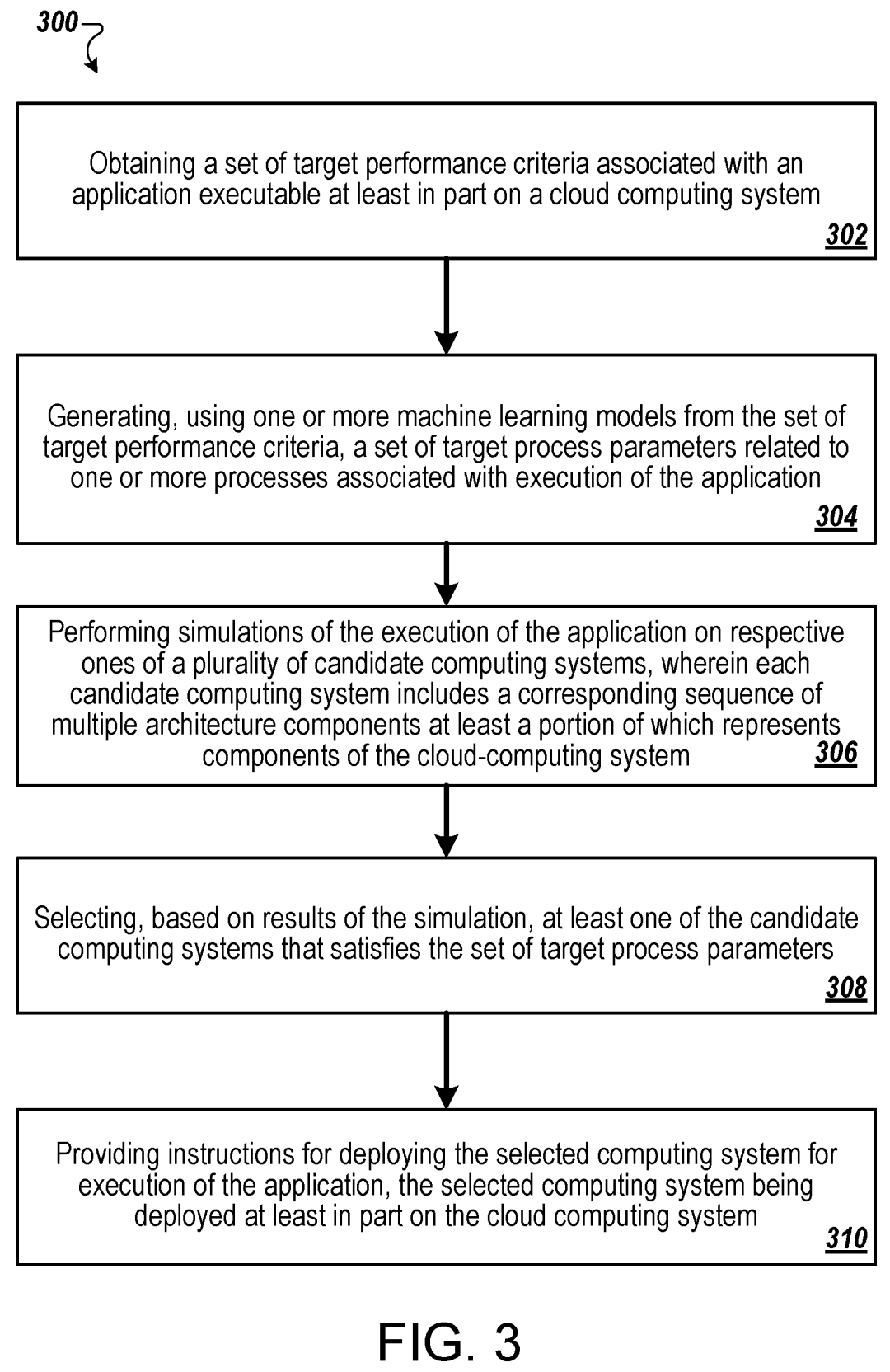

300

Obtaining a set of target performance criteria associated with an application executable at least in part on a cloud computing system

302

Generating, using one or more machine learning models from the set of target performance criteria, a set of target process parameters related to one or more processes associated with execution of the application

304

Performing simulations of the execution of the application on respective ones of a plurality of candidate computing systems, wherein each candidate computing system includes a corresponding sequence of multiple architecture components at least a portion of which represents components of the cloud-computing system　　304 306

Selecting, based on results of the simulation, at least one of the candidate computing systems that satisfies the set of target process parameters

308

Providing instructions for deploying the selected computing system for execution of the application, the selected computing system being deployed at least in part on the cloud computing system

CLOUD FITNESS ENGINEERING

CROSS-REFERENCE TO RELATED APPLICATION

This application claims the benefit of U.S. Provisional Application No. 63/469,743, filed May 30, 2023, and titled "Cloud Fitness Engineering," which is incorporated by reference.

TECHNICAL FIELD

This specification generally relates to cloud computing systems, and one particular implementation relates to determining a suitable cloud computing system architecture for a particular application.

BACKGROUND

Cloud computing offers various capabilities including on-demand availability of data storage, processing resources, and memory. Benefits of cloud computing services can include, for example, device and location independence, scalable performance, a secure data processing, to name a few examples. The myriad benefits of cloud computing systems have given rise to trends of migrating execution of programs/applications from on-premises hardware to cloud computing systems.

SUMMARY

The subject matter of this application relates to a system that can identify a cloud computing system architecture suited for a particular application in accordance with particular performance criteria. Generally, in the space of cloud computing, cloud-computing systems can employ a hybrid, multi-cloud, and edge computing device approach that meets customer needs, enhances efficiency of cloud specific applications, and improves productivity for customers. However, cloud-computing systems are complex, distributed, and asynchronous systems that can exhibit high degree of variability under various production conditions of user load, internal faults, and user input type. As such, a one-size-fits-all approach for migrating different on-premises systems to the cloud can potentially result in sub-optimal performances that fail to provide desired outcomes.

The technology described herein espouses careful tailoring of cloud-migration options that can potentially provide an optimal solution for specific technological needs of businesses. For example, key target performance parameters can be decomposed using a machine-learning/artificial intelligence (ML/AI) based approach to identify target process parameters and architectural components for particular applications. Various combinations of cloud architecture components (including combinations of cloud-architecture and on-premises architecture components) can be simulated to identify optimal solutions that satisfy the target performance parameters before deploying the solutions on an actual cloud-system.

During runtime, performance of the deployed systems can be tracked periodically to ensure that the deployed system continues to satisfy the target performance parameters, and adjustments made as needed. As such, the technology described herein provides for carefully engineered and monitored cloud-migration of on-premises systems that account for associated trade-offs, optimizations, constraints, and competing technical specifications. By extension, the technology described herein provides application-specific migration solutions that can justify the potential high costs and disruptions associated with cloud-migration.

In one general aspect, a method is performed by a server. The method includes: obtaining, at one or more processing devices, a set of target performance criteria associated with an application executable at least in part on a cloud-computing system; generating, using one or more machine-learning models from the set of target performance criteria, a set of target process parameters related to one or more processes associated with execution of the application; performing simulations, by the one or more processing devices, of the execution of the application on respective ones of a plurality of candidate computing systems, wherein each candidate computing system includes a corresponding sequence of multiple architecture components at least a portion of which represents components of the cloud-computing system; selecting, based on results of the simulations, at least one of the candidate computing systems that satisfies the set of target process parameters; and providing instructions for deploying the selected computing system for execution of the application, the selected computing system being deployed at least in part on the cloud-computing system.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: receiving, at the one or more computing devices, information pertaining to execution of the application on the deployed computing system; determining, based on the information, that execution of the application on the deployed computing system does not satisfy the set of target performance criteria; responsive to determining that the execution of the application on the deployed computing system does not satisfy the set of target performance criteria, determining, by the one or more computing devices, adjustments to be made to the deployed computing system; and providing instructions for adjusting the deployed computing system.

In some implementations, the set of target process parameters include parameters representing one or more of: throughput, latency, response time, error rates, fault tolerance, or data security.

In some implementations, the multiple architecture components include one or more of: a web server, a virtual machine, an application programming interface (API) gateway, a load balancer, a storage component, or a database.

In some implementations, the multiple architecture components represent a combination of computational resources, database resources, and storage resources.

In some implementations, the multiple architecture components are representative of one or more policies associated with the execution of the application, including one or more of: load balancing policies, data replication policies, data partitioning policies, or virtual machine policies.

In some implementations, performing the simulations includes: selecting a candidate computing system from the plurality of candidate computing systems; and performing simulations, by the one or more processing devices, of the execution of the application using the selected candidate computing system.

In some implementations, performing the simulations includes: identifying, stimuli conditions associated with the execution of the application; providing the stimuli conditions to a simulation of the execution of the application by the identified candidate computing system; and generating the results of the simulation affected by the stimuli condition.

In some implementations, the stimuli conditions include one or more of: network outage conditions, delay conditions due to a component malfunction or disconnection, configuration changes, security breaches, or load changes.

In some implementations, providing the instructions for deploying the selected computing system for execution of the application includes: providing instructions for selecting portions of the cloud-computing system for deploying at least a portion of the selected computing system; and providing, to a client device, a notification indicating deployment of the selected computing system for executing the application.

The subject matter described in this specification can be implemented in various embodiments and may result in one or more of the following advantages. In some implementations, the tailoring of cloud-migration options for specific applications can result in solutions that are optimized for particular technical criteria. For example, multiple candidate cloud-migration options can be evaluated to select an appropriate solution that is well-suited to particular technical and business objectives associated with a particular application. As such, instead of using a one-size-fits-all approach, determining a customized cloud-computing solution for a particular application—as espoused herein—can provide for mitigating uncertainty and variability typically associated with cloud migration, and help select a solution that is optimized for particular performance criteria. In some cases, this in turn can reduce requirements for major subsequent redesigning or re-engineering to account for application-specific issues, e.g., errors, low processing speeds, unavailability of components, etc. Rather, by accounting for such application-specific issues up front, robust solutions that accommodate a wide variety of issues while still meeting performance criteria can be provided. In addition, by facilitating fine tuning based on run-time data, the optimality of the selected solution can be maintained even over potentially unexpected changes.

In some implementations, the tailoring of cloud-computing services for particular application or applications can mitigate value risk, failure risk, and cost risk of cloud migration. In some cases, execution of an application in a cloud-computing environment can be inherently risky due to the distributed and heterogeneous nature of cloud-computing services. Tailoring the cloud-computing services for execution of the particular application may, in some cases, alleviate such inherent risks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is flow diagram that illustrates an example of a process for identifying a cloud computing system for executing an application in accordance with particular criteria.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1A:
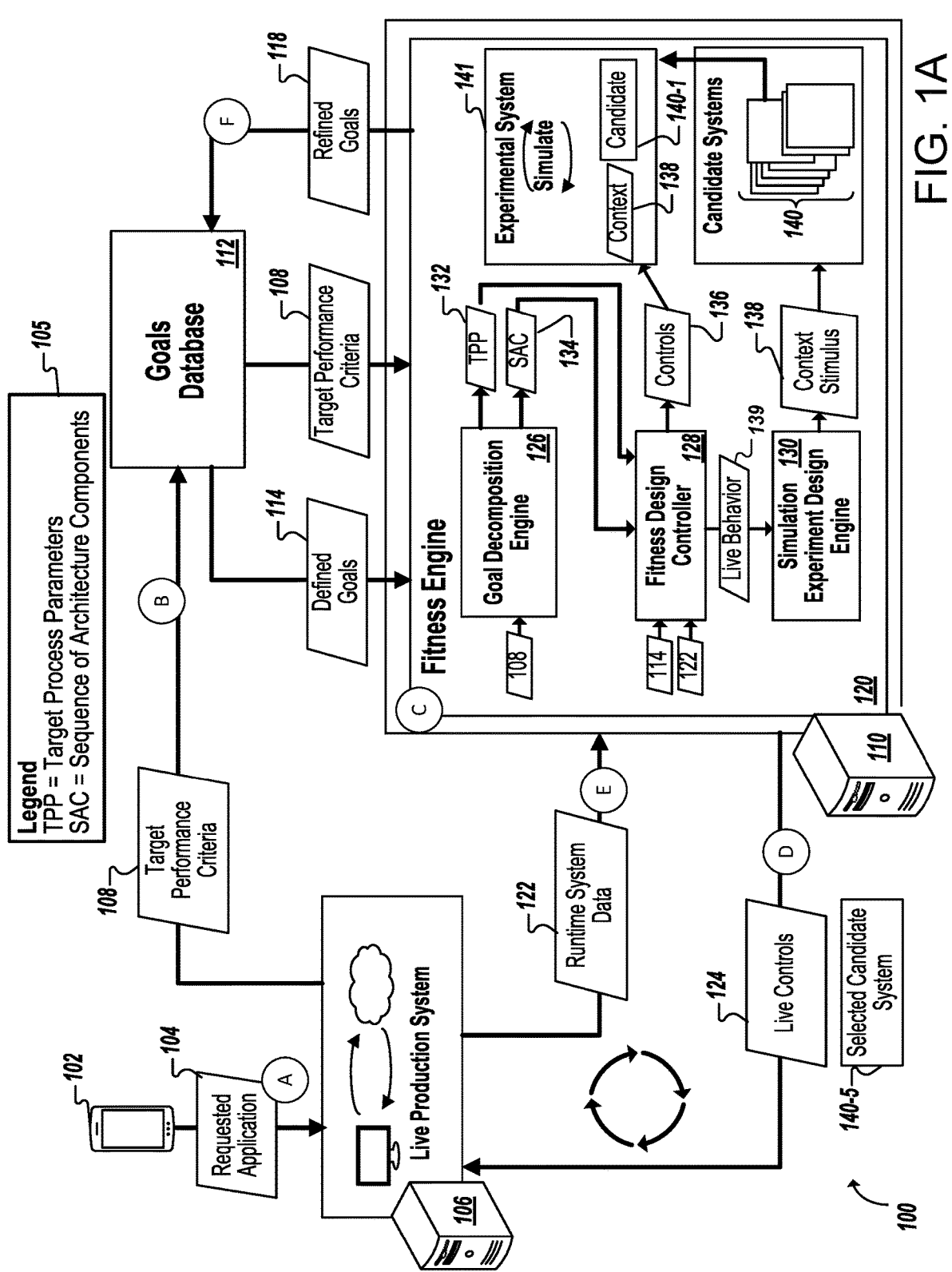
FIG. 1A is a block diagram that illustrates an example of a system for identifying a cloud computing system architecture for a particular application or applications in accordance with particular performance criteria.

FIG. 1A is a block diagram that illustrates an example of a system 100 for identifying a cloud computing system architecture for a particular application or applications in accordance with particular performance criteria. System 100 can be a distributed environment or a local environment that is configured to generate identification of a cloud computing system architecture to execute a particular application in accordance with particular performance criteria. The system 100 can, for example, analyze criteria offered by a customer for executing an application, translate the analyzed criteria into various technical components, perform simulations of the execution of the application using a simulated architecture created from the various technical components, and select an architecture for deployment associated with a simulation that matches to the criteria provided by the customer. FIG. 1A illustrates various operation in stages (A) through (F), which may be performed in the sequence indicated, in another sequence, with additional stages, or with fewer stages.

In some implementations, the system 100 includes a client device 102, a goals database 112, a live system 106, and a cloud-computing server 110. The live system 106 can be a cloud computing system that includes one or more computers or servers connected locally or over a network. The live system 106 can be a deployed cloud computing system that executes an application according to instructions provided by the cloud-computing server 110. In some examples, the live system 106 can communicate with the client device 102, a goals database 112, and the cloud-computing server 110 over a network.

The cloud-computing server 110 can be a cloud computing system that includes one or more computers or servers connected locally or over a network. In some examples, the cloud computing system of the cloud-computing server 110 may be the same or may be different from the cloud computing system utilized by the live system 106. The cloud-computing server 110 can communicate with the live system 106, the goals database 112, and the client device 102 over a network. In some examples, the cloud-computing server 110 can communicate with the client device 102 over the network.

In some implementations, the goals database 112 can include one or more databases that store target performance criteria for various entities. The goals database 112 can include be stored in, for example, databases, warehouses, distributed data storage systems, local data storage systems, and utilize other components. The goals database 112 can store target performance criteria that includes performance criteria related to execution of an application for a particular entity. In some implementations, the performance criteria can be specified in terms of one or more business goals (e.g., revenue growth, customer attrition rates, and number of sales in a particular time period, etc.) that can be translated into one or more target technical criteria associated with execution of the application. Such target technical criteria can include, e.g., processing speeds, memory consumption, latency, and application utilization, to name a few examples. As one example, if a particular application executes to generate outputs with latency lower than a threshold, such low latency application may result in satisfied customers— and by extension, a low customer attrition rate. In another example, if an amount of cloud resources for execution of an application can be optimized, such optimization can reduce wastage of over-leased cloud resources and therefore translate to revenue growth over time. As such, various business goals can be intricately tied to various combinations of hardware performance criteria, which may not be readily apparent. The technology described herein uses machine learning (ML) and artificial intelligence (AI) based approaches where trained ML models can identify target hardware performance criteria associated with a particular application from specified business goals.

In some implementations, ML models used in identifying the target performance criteria can be trained based on information stored in the goals database 112. For example, the goals database 112 can store historical data of target performance criteria linked to corresponding business goals. The historical data can include previous target performance criteria for various customers that have utilized the cloud-computing server 110. As will be further described below, each time a customer requests for an application to execute on the live system 106 and the cloud-computing server 110, the customer can provide the application and target performance criteria related to the execution of the application. In response to the live system 106 receiving the corresponding target performance criteria, the live system 106 can store the target performance criteria in the goals database 112, which can be stored for future retrieval, for example, to train or retrain an ML model that identifies target performance criteria from stated business goals.

The network can include, for example, a local network, such as Bluetooth, WiFi, or a larger network, such as the Internet or a cloud network. In some examples, a customer can directly interact with either live system 106 or cloud-computing server 110 by way of a touchscreen or a monitor, keyboard, and mouse. In some examples, the customer can access the live system 106 or the cloud-computing server 110 by entering a URL address associated with the respective live system 106 or the cloud-computing server 110 into a browser. Other examples are also possible.

A cloud computing system enables entities (e.g., customers) to execute their applications in the cloud e.g., in a virtual and/or distributed environment, as compared to, for example, their on-premises systems. On-premise systems can include a customer's own software and hardware that executes one or more applications and is hosted at a physical location accessible to the customer. Cloud computing systems can utilize various hybrid components, e.g., edge computing components and other disperse computing components, to execute customer applications in cloud environment. When customers transition their application execution from on-premises systems to cloud computing systems, overall productivity for customers can be improved as their on-premises systems can be repurposed for other directives or removed entirely, reducing their footprint.

In some cases, the functionalities of executing such applications in cloud computing systems versus executing such applications in on-premises systems remain unchanged. However, customers moving the execution of their applications from on-premises systems to cloud computing systems may expect an improvement in business outcomes, technical outcomes, or other outcomes. For example, these customers may expect the cloud computing systems to unlock value and directly influence business outcomes to justify investments in such cloud computing technologies. As such, the technology described throughout this specification describes tailoring of cloud-migration options that can potentially provide an optimal solution for customers seeking specific technical requirements and business requirements when executing these components in a cloud computing system.

In some cases, applications executed on the cloud computing system can be executed in an architecture that is purposefully engineered to realize customer desired business outcomes. By engineering a cloud computing system that is designed to execute one or more applications in an optimal manner, customers may be more inclined to transition their applications into the cloud computing system, particularly if such cloud-based execution helps achieve particular desired outcomes.

However, engineering architectures for cloud computing systems for a specific application to meet technical and business-aligned capabilities can be laborious. In some examples, cloud-computing systems are distributed, asynchronous, event and message driven, which can present a high degree of uncertainty and variability during design and runtime of the application's execution. In some examples, engineering cloud system architectures for a specific application can include analyzing various tradeoffs, carefully varying optimizations, selecting architecture choices against constraints, and resolving conflicts between competing technical specifications.

Further, the system 100 can employ various techniques in designing a cloud computing architecture for execution of an application. For example, the system 100 can decompose target performance criteria of the customer for execution of the application to (i) a set of target process parameters related to one or more processes associated with the execution of the application and (ii) a sequence of architecture components associated with the execution of the application. In further detail, the system 100 can decompose or translate the target performance criteria into the set of target process parameters, and can decompose or translate the set of target process parameters into the sequence of architecture components associated with the execution of the application. The set of target process parameters can include, for example, throughput, latency, response time, error rates, resiliency, availability, and security, to name some examples. The sequence of architecture components can include, for example, a trace sequence between web servers, API gateways, a load balancer, a webserver, various microservices, and other components, to name such examples.

Performance specifications for generating a cloud computing system can often be mutually conflicting. For example, a first performance specification may indicate a response time of less than 3 milliseconds (ms) and a second performance specification may indicate a throughput of no less than 3 ms. In this example, the system 100 may need to apply tradeoffs and resolve design conflicts of mutually exclusive performance specifications in order to meet the target performance criteria set by the customer. These performance specifications need to be managed in a cloud-computing environment under variability, uncertainty, complexity, and opacity, to name some examples.

Variability can be represented as a behavior a distributed system displays high variability under various production conditions. These various production conditions can include, for example, user load, internal faults, and user input type. Uncertainty can be represented as ambiguity in the behavior of a deployed cloud-computing system, which may not be easily envisaged during the design and creation of an architecture of the cloud-computing system. Complexity can reflect an intricate number of services offered by each cloud provider, which can continue to grow and evolve over time. Opacity can represent the lack of transparency related to internal control and data pathways of distributed cloud systems, which may be difficult to diagnose by developers and/or engineers, as often the actual fault and manifestation of system failure can be characterized in terms of spatial and temporal dimensions.

In some examples, the system 100 can address risk that arises due to value risk and cost risk. Value risk can include risks that arise due to application executing on the cloud-computing server failing to harness the underlying cloud resources and align the resources with business goals and ultimately, unlock business values. With this risk, cloud adoption may not provide advantages over on-premises systems and the costs associated with the cloud adoption may not be commensurate with the value gained. Cost risk can reflect cloud applications that can provision cloud services at runtime programmatically. While cloud applications bring scalability and elasticity to the application, cloud applications may also result in cloud resources usage being over-engineered and not commensurate or tailored with the value gained from adopting the cloud environment.

In response to the system 100 identifying and managing tradeoffs, the system 100 can translate the set of target performance criteria to actual system design and architecture decisions for deployment of a cloud-computing system. In some examples, the system 100 can translate the set of target performance criteria to the actual system design and architecture decisions by iterating through various candidate cloud-computing system architectures. This process will be further described below.

In some implementations, the system 100 can exhibit cloud application fitness when executing an application on a deployed cloud-computing system. Cloud application fitness represents a workload ability of an application executed on the deployed cloud-computing system to adaptively harness and align cloud resources to unlock business value with various costs commensurate with customer requirements, e.g., business goals, technical goals, etc. The cloud application fitness can also represent an ability to adapt to varying workload contexts while maintaining target service performance.

Context can refer to practical situations or real-life data that the live system 106 encounters during execution of the application. In some examples, the context can include user profiles that access the live system. The user profile can identify a user of the live system 106 and a location of the user. In some examples, the context can include a geo-location of the devices that accessed the live system 106. In some examples, the context can include an identification of devices that accessed the live system 106, e.g., IP address, MAC address, hostname, device identifiers, etc., and Internet of Things (IoT) devices. In some implementations, the context can include transaction information associated with the application executing on the live system 106. The transaction information can include, for example, various types of transactions, e.g., financial transactions, application transactions, and querying transactions, header information, payload information, and other types of information identified in a transaction for an application. The context can include data indicative of business events, for example, data representing tax deadlines, data representing national holidays, e.g., New Years, Black Friday, and Memorial Day, etc., sports events, government events, and other events. The context can include data indicative of cloud application disruptions, such as network disruptions, misuse disruptions, technical failures, calamities, power outages, database disruptions, and other disruptions, to name some examples.

The context can include data indicative of historical trends of usage with the live system 106. The historical trends can include data that reflects, for example, a frequency with which the live system 106 was previously interacted by a client device, how the live system 106 was utilized when previously interacted with via a client device, previous disruptions associated with the live system 106, previously applications utilized by the live system 106, and any other historical data employed and utilized by the live system 106.

To enable and facilitate the performance of cloud specific applications to achieve customer requested capabilities, the system 100 can provide for designing a cloud system architecture that can automatically translate customer requested capabilities into technical solutions. In particular, the cloud-computing server 110 can acquire customer requested capabilities for executing an application in the cloud, transform the customer requested capabilities into technical specifications for executing the application, design the cloud system architecture for executing the application according to the transformed technical specifications, and deploy the designed cloud system architecture into the live system 106 for execution of the application. In some implementations, the cloud-computing server 110 can iterate through various cloud system candidate architectures executing a simulation of the application using a simulation engine, e.g., fitness engine 120, and identify a cloud system candidate architecture that meets the transformed technical specifications. In some implementations, the cloud-computing server 110 can deploy the identified cloud system candidate architecture to the live system 106 for execution of the cloud specific application for the customer.

Referring to FIG. 1A, at stage (A), a user can provide a query 104 to the live system 106. The user can be an individual (or a customer entity such as a business) seeking to execute an application on the live system 106. For example, the user can request for the live system 106 to execute a video game application, a business product application, a financial application, or another type of application. The user can interact with a client device 102 to enter the query 104 via typing, speaking, or interacting with a touch screen of the client device 102. In some examples, the user can interact directly with the live system 106.

In some implementations, the query 104 can include data identifying a particular application to be executed on the live system 106. This data can include, for example, data identifying where the executable of the application is stored locally or on a network, such as the internet, for downloading and executing, and data identifying characteristics of the application, e.g., application size and requirements needed to execute. Other examples for identifying the particular application are also possible. The query 104 can include data identifying target performance criteria associated with the execution of the application. The data identifying the target performance criteria can include, for example, business goals and technical goals related to the execution of the application.

In some examples, data identifying the target performance criteria can include a 20% increase in daily trading volumes and settlements in using a cloud-based platform for executing the application over executing the same application using on-premises hardware. In this example, the cloud-based platform may need to automatically adapt to provide trading priority of specific commodities based on designated business events. In some examples, data identifying the target performance criteria can reflect that using the cloud-based platform over the on-premises version provides a business goal of a 25% increase in revenue through various portals and to reduce the daily room allocation cycle time from 13 hours to 30 minutes with a marginal increase of 2% in reducing costs. In some examples, data identifying the target performance criteria can reflect that using the cloud-based platform over the on-premises version enables an increase in average revenue per customer by 25% at 15% reduced resource costs. In some examples, data identifying the target performance criteria can reflect a current performance, e.g., business performance and/or technical performance, of executing the application in an on-premises environment. In some examples, data identifying the target performance criteria can reflect that using the cloud-based platform in combination with the on-premises versions increases a processing speed by 30%. Other examples for data identifying the target performance criteria are also possible, e.g., profit, turnaround time for a user request, etc.

In some implementations, the query 104 may include personalized information of the client device 102. The personalized information can include, for example, credentials of the user seeking authorization to communicate with the live system 106 and the cloud-computing server 110, e.g., username and password, data identifying the client device 102, and a location of the client device 102. In some examples, the query 104 can include data identifying a role of the user who transmitted the query 104, which may indicate to the live system 106 an amount of features the user is able to access.

The client device 102, which can include a personal handheld device, a mobile device, a tablet, a personal computer, or other, can receive the user's input and transmit the query 104 to the live system 106. In some examples, the client device 102 can transmit the query 104 over a network. Alternatively, if the client device 102 is connected to the live system 106, e.g., a display for user interaction connected to the live system 106, and then the live system 106 can accept the query 104 in response to the user's entry.

During stage (B), the live system 106 can receive the query 104 from the client device 102. In some implementations, the live system 106 can recognize and determine that the query 104 can correspond to a request from a particular user, e.g., user associated with client device 102. For example, the live system 106 can authorize the user's access to utilize the live system 106 by comparing stored credentials to credentials provided in the query 104. If the live system 106 determines that a match does not exist, the live system 106 can deny the user's access to execute the requested application in the query 104. If the live system 106 determines that a match does exist, the live system 106 can identify the user that transmitted the request from the client device 102 and extract contents from the query 104.

In some implementations, the live system 106 can access the data identifying the application to be executed from the query 104. In the event the application indicated in the query 104 has been executed by the live system 106 before, the live system 106 can retrieve from memory the data identifying application. In the event the application indicated in the query 104 has not been executed by the live system 106 before, the live system 106 can retrieve an executable or another downloadable for the application from a network, or another location.

The live system 106 may utilize controls, instructions, and/or parameters from the cloud-computing server 110 to execute the application identified in the query 104. However, in order for the cloud-computing server 110 to provide controls, instructions, and/or parameters that enable the live system 106 to execute the application identified in the query 104 such that the results align with the target performance criteria, the cloud-computing server 110 can analyze the target performance criteria to produce such controls. Thus, the live system 106 can extract, from the query 104, the target performance criteria 108 and provide the target performance criteria 108 to the goals database 112 over the network. The goals database 112 can store the target performance criteria for storage and for future retrieval by both the live system 106 and the cloud-computing server 110.

In some implementations, the goals database 112 can receive the target performance criteria 108 from the live system 106. The target performance criteria 108 can include the target performance criteria identified in the query 104, data identifying the application to execute, and data identifying the user that transmitted the query 104, to name some examples. The goals database 112 can store the received target performance criteria 108 in memory using the data identifying the user that that transmitted the query 104 as an index.

In this manner, the goals database 112 can access previously stored target performance criteria 108 for each user that submitted a query to utilize the live system. In some examples, the goals database 112 can be indexed by data identifying the client device 102. In this manner, the cloud-computing server 110 can access stored target performance criteria 108 to monitor how one or more users utilizes the live system 106 over a previous period of time.

During stage (C), the cloud-computing server 110 can receive target performance criteria 108 from the goals database 112. In some implementations, the cloud-computing server 110 may receive the specific target performance criteria 108 from the goals database 112 in response to the goals database 112 receiving the target performance criteria 108 from the live system 106. In this implementation, the goals database 112 receiving the target performance criteria 108 from the live system 106 can trigger the cloud-computing server 110's creation of a cloud-computing architecture for executing the application on the live system 106. In further detail, the goals database 112 can receive the target performance criteria 108 from the live system 106, store the target performance criteria 108 in memory, and transmit the target performance criteria 108 to the cloud-computing server 110 for creation of the cloud-computing architecture.

In some implementations, the cloud-computing server 110 may periodically poll the goals database 112 for new target performance criteria 108. The cloud-computing server 110 may periodically poll the goals database 112 to identify recently stored target performance criteria to create new cloud-computing architecture to execute a corresponding application on the live system 106. For example, the cloud-computing server 110 can periodically poll the goals database 112 on a daily, weekly, or monthly basis, to name some examples.

The cloud-computing server 110 can receive target performance or defined goals 114 in addition to the target performance criteria 108. In some examples, the defined goals 114 can represent the current performance of the customer or business. In some examples, the defined goals 114 can represent the goals of the customer or business or goals defined by a designer of the cloud-computing server 110. In particular, the defined goals 114 can represent a technical specification, or a business specification associated with the application. For example, the defined goals 114 can indicate that the processor of the on-premises system while executing the application performs at a 50% duty cycle and a current customer attrition rate while executing the application is 20%. However, the target performance criteria 108, which defines criteria for executing the application on the cloud platform can indicate, in this example, that the client device 102 requests for a 25% duty cycle of the processor while executing the application and a customer attrition rate while executing the application to be 10%.

The cloud-computing server 110 can utilize a fitness engine 120 to identify, in an iterative manner, a cloud-computing architecture that meets the target performance criteria 108 provided by the user in the query 104. In some implementations, the fitness engine 120 can include various engines that can decompose or translate the target performance criteria 108 into (i) a set of controls for executing the application on the live system 106 and (ii) a particular cloud candidate system that the live system 106 can utilize for executing the application on the live system 106. The engines of the fitness engine 120 can include, for example, a goal decomposition engine 126, a fitness design controller 128, and a simulation experiment design engine 130. The fitness engine 120 can include an experimental system 141 and a set of cloud candidate computing systems 140 that work in tandem with the various engines to produce the cloud-computing architecture and the set of controls for executing the application on the live system 106.

In some implementations, the goal decomposition engine 126 can include one or more trained machine-learning models configured to produce (i) target process parameters and (ii) sequence of architecture components. In further details, the one or more trained machine-learning models can be configured to produce (i) target process parameters and (ii) sequence of architecture components from the target performance criteria 108. The target performance criteria 108 can further define outcomes that include improvements to executing the application in a cloud specific environment over on-premises system. The one or more trained machine-learning model can receive, as input, the target performance criteria 108 and decompose or translate the target performance criteria 108 into target process parameters.

Generally, the machine-learning techniques employed by each of the engines in the fitness engine 120 can encompass a wide variety of different techniques that are used to train a machine to perform decomposition or translation of the target performance criteria 108 into the (i) target process parameters and (ii) the sequence of architecture components.

For example, the machine-learning models can be trained using different machine-learning techniques, including, for example, supervised learning, unsupervised learning, and reinforcement learning. In supervised learning, inputs and corresponding outputs of interest are provided to the machine-learning model. The machine-learning model can adjust its functions in order to provide the desired output when the inputs are provided. Supervised learning is generally used to teach a machine-learning model to solve problems in which are outcome determinative. In contrast, in unsupervised learning inputs are provided without providing a corresponding desired output. Reinforcement learning describes an algorithm which a machine makes decisions using trial and error. Feedback informs the machine when a good choice or bad choice is made. The machine then adjusts its algorithms accordingly.

In some examples, the live system behavior model 142 and the experimental system behavior model 144 can perform behavior anomaly detection. Some of the behavior anomaly detection can include, for example, out of control error rates, latency, throughput, and response times. The live system behavior model 142 and the experimental system behavior model 144 can utilize K-nearest neighbors algorithm (KNN) and support vector machines (SVMs) to perform behavior anomaly detection. In some examples, the live system behavior model 142 and the experimental system behavior model 144 can utilize recurrent neural networks (RNNs) to perform time series prediction of target process parameters and sequence of architecture components, in addition to checking for possible future outliers.

In some examples, the goal decomposition engine 126 can utilize various algorithms such as regression and association rule mining for performing correlation. In particular, the goal decomposition engine 126 can perform correlations between (i) design decisions and sequence of architecture components 134, (ii) target process parameters 132 and sequence of architecture components 134, and (iii) target process parameters 132 and target performance criteria 108. The goal decomposition engine 126 can perform these correlations to identify similarities between each of these criteria.

In some examples, the fitness design controller 128 can analyze the system data 122 from the live system 106 and the system data 156 from the lab system 141 using various components. In particular, the fitness design controller 128 can analyze the system data 122 and the system data 156 using various language models, natural language processing (NLP) techniques, and semantic association techniques to discover use cases and failure casual chains at the lab system 141 and the live system 106.

Figure 1B:
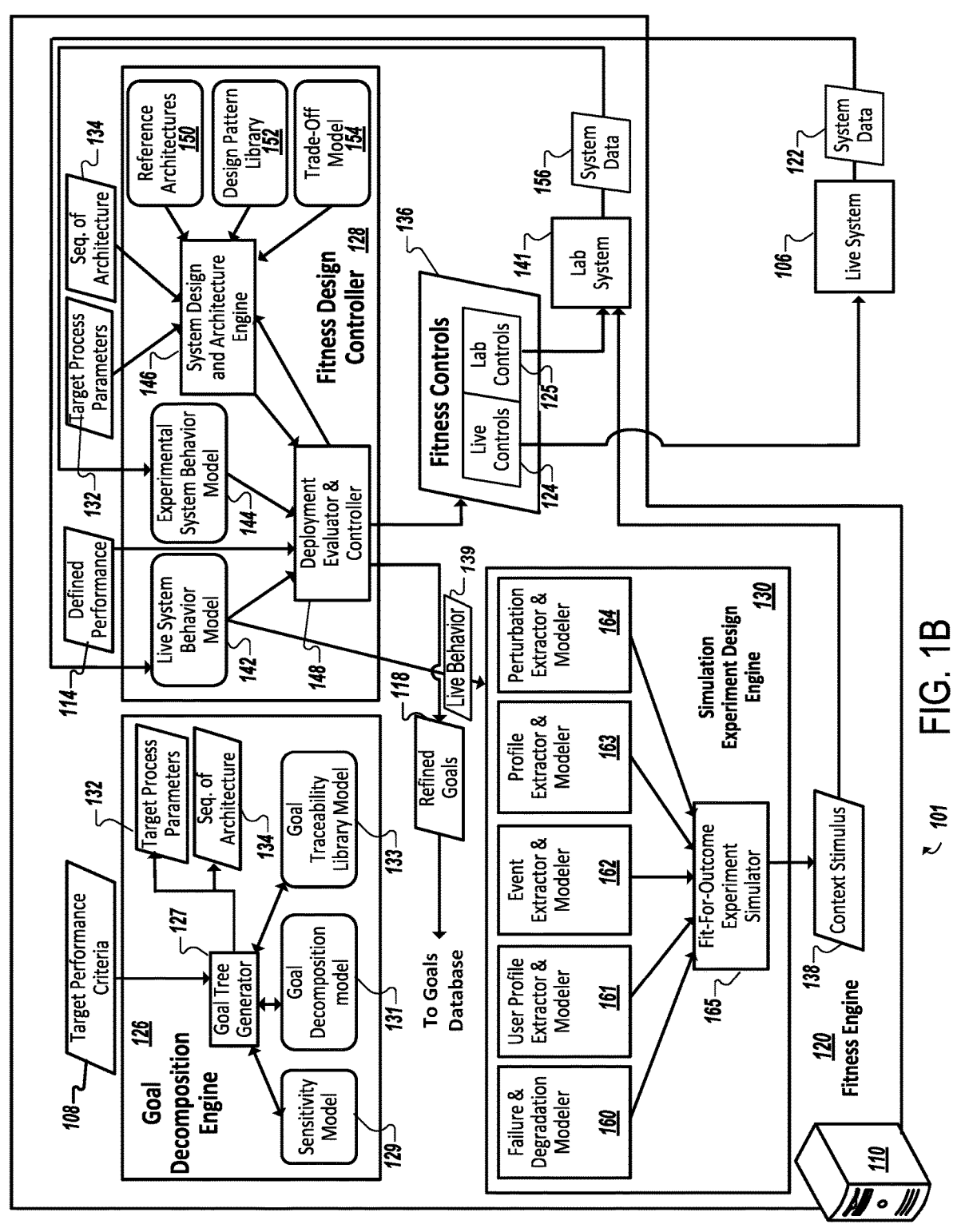
FIG. 1B is a block diagram that illustrates an example of a fitness engine to iteratively fine-tune an application-specific cloud computing system architecture.

FIG. 1B illustrates a more detailed view of the components illustrated in the fitness engine 120 of FIG. 1A. Specifically, as illustrated in FIG. 1B, the goal decomposition engine 126 can include various models that process the target performance criteria 108. In particular, the goal decomposition engine 126 can include a goal tree generator 127, a sensitivity model 129, a goal decomposition model 131, and a goal traceability library model. Each of these components within the goal decomposition engine 126 work collectively to produce the target process parameters 132 and the sequence of architecture components 134 from the target performance criteria 108.

In some implementations, the goal tree generator 127 can process the data identified in the target performance criteria 108. In particular, the goal tree generator 127 can include one or more high-level programming languages that are programmed to recognize and extract a plurality of terms from the target performance criteria 108. For example, the goal tree generator 107 can include a python, C++, java, or other module that uses coded instructions to identify terms, words, and phrases that describes goals for executing the application on the live system 106 in the target performance criteria 108. In some cases, the goal tree generator 107 can include one or more trained machine-learning algorithms to identify terms and words from the target performance criteria 108. The goal tree generator 107 can receive the target performance criteria 108 and can parse the data into one or more words. For example, the goal tree generator 107 can parse the target performance criteria 108 to identify these words: "increase," "average," "revenue," "per," "customer," and "20%," among others.

In some implementations, the goal tree generator 107 can generate entities from the identified words and various relationships in the target performance criteria 108. For example, each word or term identified in the target performance criteria 108 can be searched against a data source, such as a dictionary of terms or a textbook that describe business and/or technical concepts. Based on the definition or description of each identified word in the target performance criteria 108, the goal tree generator 107 can separate the entities, such as nouns, and relationships between each of the words, such as actions performed by the entities.

In some implementations, the goal tree generator 107 can perform contextual analysis on the identified words and relationships of the identified words from the target performance criteria 108. In further detail, the goal tree generator 107 can apply one or more trained machine-learning algorithms to identify a context associated with each of the identified words. The context can indicate, for example, a meaning of each of the words in the context of the target performance criteria 108 and a statistical likelihood indicating how confident the goal tree generator 107 is in the determined meaning of the identified word.

Using the (i) identified context of the identified word and (ii) the statistical likelihood indicating how confident the goal tree generator 107 is in the determined meaning of the identified words, the goal tree generator 107 can apply a rules-based approach to convert the (i) and (ii) of the identified word to the target process parameters (TPP) 132. In some implementations, the TPP 132 can represent the processes to be performed for the target performance criteria 108. In some examples, the TPP 132 can include various end-to-end flows of a specific task of the target performance criteria 108, e.g., a business process, which can include for example, a user search, a trade order for a financial trade, or an invoice creation, to name some examples. The TPP 132, which is subsequently utilized by the fitness engine 120, can be utilized to create the sequence of architecture components (SAC) 134, as will be further described below.

In some implementations, the goal tree generator 107 can apply the data indicative of the TPP 132 to one more trained machine-learning models to generate the SAC 134. The SAC 134 can represent the processes and flows of data for the cloud-computing components of the live system 106 to utilize during the execution of the requested application from the query 104. For example, the processes and the flows of the cloud-computing components of the live system 106 can include one or more response times between components, a threshold latency between distributed components, a CPU utilization at one or more servers, a database search latency, one or more functions to call of the API Gateway, one or more message types utilized by the message service, and web server communication types, to name some examples.

In some implementations, the goal tree generator 127 can communicate with a goal decomposition model 131. The goal decomposition model 131 can include one or more trained machine-learning models used by the goal tree generator 127 to (i) perform the NLP processing of the target performance criteria, (ii) convert the target performance criteria into the TPP 132 and (iii) converting the TPP 132 into the SAC 134. The goal decomposition model 131 can be continuously updated over time and retrained to improve its conversion. The goal tree generator 127 can retrieve a trained model from the goal decomposition model 131 and utilize the model for conversion. As the fitness engine 120 iteratively processes the target performance criteria over time, the goal decomposition model 131 can update its weights and parameters.

In one particular example, the target performance criteria 108 can indicate a goal of an increase in average revenue per customer by 20% in 2 years' time by executing the application in the cloud computing system over executing the application on-premise. The goal decomposition engine 126 can receive the target performance criteria 108 and can decompose the target performance criteria 108 into various target process parameters 132 and sequence of architecture components 134 using the goal tree generator 127, the goal decomposition model 131, sensitivity model 129, and the goal traceability library model 133. The output TPP 132 may include, for example, customer item search response time and checkout completion response time. The output SAC 134 may include, for example, API gateway latency, Microservices response latency, and database throughput, among others.

As further described below, the fitness engine 120 can seek to identify architecture design choices using the TPP 132 and the SAC 134. For example, the fitness design engine 120 can progressively iterate through continuous simulations that execute the application using cloud candidate computing systems 140 to meet the criteria identified by the TPP 132 and the SAC 134. A particular candidate system of the cloud candidate computing systems 140 that enables the fitness design engine 120 to execute the application and meets the criteria identified by the TPP 132 and the SAC 134 can be deployed to the live system 106.

The one or more trained machine-learning models of the goal tree generator 127 can be configured to attempt to match the data indicative of the TPP 132 to the data indicative of the SAC 134. In some examples, the TPP 132 can include a goal of a user performing a search in a database and the one or more trained machine-learning models can be configured to match this goal to an SAC 134 goal of a database search latency of less than 0.1 milliseconds. In some examples, the TPP 132 can include a goal of a user sending a particular payment message to for a cash flow and the one or more trained machine-learning models can be configured to match this goal to an SAC 134 goal of a messaging service using HTTPS messaging for payments messages. Other examples are also possible. The one or more trained machine-learning models match goals of the TPP 132 to goals of the SAC 134 can analyze the context of the TPP 132 in an attempt to match to interpreted functionalities of the goals of the SAC 134. In this manner, the goal tree generator 107 can aid in ensuring the design and architecture decisions of the cloud-computing system match or align with the customer requested capabilities and criteria.

In some implementations, the goal tree generator 127 can communicate with a sensitivity model 129. The sensitivity model 129 can assess and determine whether to adjust the weights, confidences, and sensitivities of each of the trained machine-learning models utilized by the goal tree generator 127 and stored in the goal decomposition model 131. The sensitivity model 129 can initially set values for the trained machine-learning models for (i) converting the target performance criteria into the TPP 132 and (ii) converting the TPP 132 into the SAC 134. As will be further described below, depending on a proximity of simulation criteria outcomes and live criteria outcomes associated with the live system 106, the sensitivity model 129 can update the weights, confidences, and sensitivities of each of the trained machine-learning models in the goal tree generator 127.

In some implementations, the goal tree generator 127 can communicate with a goal traceability library model 133. The goal traceability library model 133 can include a model that retrieves one or more functions according to the converted SAC 134. In further detail, each time the goal tree generator 127 produces goals of the SAC 134, the goal traceability library model 133 can include one or more rules that match the goals of the SAC 134 to one or more functions to be used to execute the application associated with the cloud-computing system. The goal traceability library model 133 accumulates a library of functions to be used for executing the application associated with the cloud-computing system. The accumulated library of functions is utilized by the experimental system 141 and the live system 106, as will be further described below. In further detail, the goal traceability library model 133 can generate a trace between goals from the target performance criteria 108 to cloud computing system parameters that need to be tuned, such as those identified in the cloud candidate computing systems 140.

Turning back to FIG. 1A, the goal decomposition engine 126 can generate the TPP 132 and the SAC 134 that corresponds to the target performance criteria 108. In some implementations, the fitness engine 120 can provide the TPP 132 and the SAC 134 into the fitness design controller 128. Similarly, the fitness design controller 128 can receive the defined performance 114 and the runtime system data 122 from the live system 106. In some examples, prior to the live system 106 first executing the application identified in the query 104, the runtime system data 122 is empty. Following the first execution of the application identified in the query 104 and for each subsequent iterative execution of the application on the live system 106, the runtime system data 122 can include data that identifies states and outcomes of the live system 106. This process will be further described below.

FIG. 1B illustrates a more detailed view of the components, functions, and inputs/outputs of the fitness design controller 128. Specifically, the fitness design controller 128 can include a live system behavior model 142, an experimental system behavior model 144, a system design and architecture engine 146, a deployment evaluator and controller 148, reference architectures 150, a design pattern library 152, and a trade-off model 154. Each of these components within the fitness design controller 128 can work collectively to produce fitness controls 136 for simulating the execution of the application in a simulated environment and in the live system 106, as will be further described below.

In some implementations, the system design and architecture engine 146 can receive the TPP 132 and the SAC 134 from the goal decomposition engine 126. The system design and architecture engine 146 can generate an architecture of the cloud-computing system to be used for executing the application according to the TPP 132 and the SAC 134. In particular, the architecture of the cloud-computing system can include one or more of these components, for example, a web server, a virtual machine, an application programming interface (AP) gateway, a load balancer, a storage component, a database, a server, a switch, and any other device used in cloud-computing systems. Generally, the architecture of the cloud-computing system can include a combination of computational resources, database resources, and storage resources.

The system design and architecture engine 146 can include one or more trained machine-learning models configured to translate or decompose the data included in the TPP 132 and the SAC 134 to various components and policies for the architecture of the cloud-computing system. Specifically, the one or more trained machine-learning models can translate the TPP 132 and the SAC 134 into one or more policies associated with the execution of the application. The one or more policies can include, for example, load balancing policies associated with a load balancer, data replication policies associated with a database, a server, and storage components, data partitioning policies associated with the various storage components, and virtual machine policies associated with one or more virtual machines. Other policies can also be generated, such as, scalability policies, security policies, and resource efficiency policies, to name some examples.

The system design and architecture engine 146 can formulate data indicative of the generated architecture for the cloud-computing system. The data indicative of the generated architecture can include, for example, textual data of the generated architecture, a tabulated format of the generated architecture, a visual graph of the generated architecture, and other types of descriptors representing the architecture. The data indicative of the generated architecture can include (i) the components included in the architecture, (ii) how each of the components included in the architecture communicate and connect with one another, (iii) functions performed by each of the components, and (iv) functions performed between each of the components. The system design and architecture engine 146 can provide the data indicative of the generated architecture to the deployment evaluator & controller 148.

In some implementations, the reference architectures 150 can include previous architectures generated by the fitness design controller 128. The reference architectures 150 can store data describing the previous architectures, e.g., the components utilized, how the components connect with one another, how the components communicate with one another, and the functions associated with each of the components and in-between each of the components. The reference architectures can be included in the cloud candidate computing systems 140 and utilized in an attempt to identify a cloud-computing architecture for executing the application.

The system design and architecture engine 146 can retrieve an architecture from the reference architectures 150 when seeking to identify a corresponding architecture for using the TPP 132 and the SAC 134. Specifically, the design and architecture engine 146 can seek to determine whether the one or more architecture components and processes identified by the SAC 134 match to any previously created architectures defined by the reference architectures 150. If no architectures match to the SAC 134, then the system design and architecture engine 146 can generate a new architecture. Alternatively, if an architecture matches to the data included in the SAC 134, then the system design and architecture engine 146 can use the previously generated matched architecture as an architecture for implementation.

In some implementations, the design pattern library 152 can store configuration data for each architecture of the reference architectures 150. The configuration data can include, for example, a library or libraries of functions utilized by each of the previous architectures in the reference architectures 150, configuration data of how the functions can interact with one another, API calls for each of the functions in the library or libraries of functions, and a sequence trace through one or more functions for a specific process associated with a previous architecture, to name some examples. The system design and architecture engine 146 can reference data from the design pattern library 152 when identifying a particular architecture to use for executing the application on the cloud platform.

In some examples, the system design and architecture engine 145 can select a particular design pattern from the design pattern library 152 according to the identified architecture. Specifically, in response to the system design and architecture engine 145 translating the TPP 132 and the SAC 134 into a particular architecture, the system design and architecture engine 146 can access the design pattern library 152 to identify configuration data that closely matches to the particular architecture. The design pattern library 152 can store pattern implementations for improving reliability, security, performance, and cost. The pattern implementations can include, for example, retry and throttling configuration, health check telemetry, circuit breakers, bulkheads, and compensating transactions, to name some examples.

In some implementations, the trade-off model 154 can include one or trained machine-learning models or mathematical models that are configured to analyze specifications from the TPP 132 and the SAC 134. Specifically, the trade-off model 154 can analyze competing specifications or performances and determine how the specifications should be weighed. In some examples, the trade-off model 154 may designate that response times should be given higher weight than throughput. In some examples, the trade-off model 154 may designate that a reduction in error rate should be given higher weight than response times. The trade-off model 154 may initially designate specifications or performances using a configuration file. Overtime, the trade-off model 154 can revise the designated specifications or performances according to preferences given by users over time for their criteria, e.g., target performance criteria 108. Other examples are also possible.

In this manner, the trade-off model 154 can apply the weighted specifications and performances to the system design and architecture engine 146 for producing the architecture from the TPP 132 and the SAC 134. As the trade-off model 154 adjusts its weighted specifications and performance over time, the trade-off model 154 can update the weighted specifications and performances used by the system design and architecture engine 146. In this manner the trade-off model 154 and the system design and architecture engine 146 can work together in a seamless manner to produce architectures more in-line with customer preferences.

In some implementations, the deployment evaluator and controller 148 can generate fitness controls 136 for commanding and controlling the components of the live system 106 and the experimental system 141. As illustrated in FIG. 1B, the deployment evaluator and controller 148 can produce fitness controls 136 that include command and controls 124 for the live system 106 and command and controls 125 for the experimental system 141. The deployment evaluator and controller 148 can receive inputs from the live system behavior model 142, the experimental system behavior model 144, and the defined performance 114.

In some implementations, the live system behavior model 142 can model the behavior of the live system 106. Specifically, the live system behavior model 142 can include one or more trained machine-learning models configured to model the system behavior of the live system 106 using system data 156 provided by the live system 106. For example, and as will be further described below, as the live system 106 responds to the fitness controls 136, the live system 106 produces output system data 156 that is provided back to the live system behavior model 142. Here, the live system behavior model 142 analyzes the output system data 156 of the live system 106 and determines a proximity to which the output system data 156 matches to the predicted output system data.

The trained machine-learning models of the live system behavior model 142 can receive as input the output system data 156 and predicted output system data for the live system 106. Ultimately, the live system behavior model 142 seeks to close the gap between the actual output system data 156 and the desired or predicted output system data for the live system 106. The live system behavior model 142 can determine, for example, that the live system 106's response time is 2 ms greater than desired or the live system 106's throughput is 5 mega-bytes (MB) lower than expected. The live system behavior model 142 can output these differences as deltas or errors to the deployment evaluator & controller 148 for processing.

In some implementations, the experimental system behavior model 144 can model the behavior of the lab or experimental system 141. Specifically, the experimental system behavior model 144 can include one or more trained machine-learning models configured to model the experimental system behavior of the lab or experimental system 141 using system data 122 provided by the experimental system 141. For example, and as will be further described below, the deployment evaluator can produce fitness control 136 that include both live controls 124 for the live system 106 and lab controls 125 for the lab system 141. The lab system 141 can receive the lab controls 125 and produce output system data 122 that is provided back to the experimental system behavior model 144. Here, the experimental system behavior model 144 analyzes the output system data 156 from the experimental system 141 and determines a proximity to which the output system data 156 matches to the predicted output system data.

The trained machine-learning models of the experimental system behavior model 144 can receive as input the output system data 122 and the predicted output system data for the experimental system 141. Ultimately, the experimental system behavior model 144 seeks to close the gap between the actual output system data 122 and the desired or predicted output system data for the experimental system 141. In some cases, the predicted output system data for the experimental system 141 and the predicted output system data for the live system 106 may match. By matching the predicted output system data between the experimental system 141 and the live system 106, the fitness engine 120 can attempts to match the operation and performance of the experimental system 141 to the operation and performance of the live system 106.

Thus, the output of the live system behavior model 142, the experimental system behavior model 144, the defined performance 114, and the system design and architecture engine 146 is provided to the deployment evaluator & controller 148. As mentioned, the deployment evaluator & controller 148 can generate fitness controls 135 that include both command and controls 124 for the live system 106 and command and controls 125 for the experimental system 141. The deployment evaluator & controller 148 attempts to generate fitness controls 136 that adjusts the operation of both the experimental system 141 and the live system 106 to move closer to expected operation, as defined by the TPP 132 and the SAC 134. For example, if the deployment evaluator & controller 148 receives data from both the live system behavior model 142 and the experimental system behavior model 144 indicating that the response times for both systems are greater than 2.5 ms, when they should be less than 2 ms, then the deployment evaluator & controller 148 can generate fitness controls 136 that attempt to reduce the overall response times for both systems. In this example, the fitness controls 136 can include command and controls to increase response time by, for example, removing any redundant cloud-computing architecture component in a trace sequence, utilize a cloud-computing component that is closer in proximity to another cloud-computing component of the distributed system architecture, or increase throughput by an amount directly proportional to an overall reduction required in response times. Other examples are also possible.

The fitness controls 136 can include programmatic commands and controls for the experimental system 141 and the live system 106. The programmatic commands and controls, e.g., live controls 124 and lab controls 125, can include controls for configuring components and their functionalities of the experimental system 141 and the live system 106. The live controls 124 may be, for example, hardware and/or software commands for controlling physical components of the live system 106. The live controls 124 can be based on API configurations of each of the hardware and/or software physical components of the live system 106. The lab controls 125 may be, for example, software commands for controlling simulated components of the experimental system 141. As such, the software commands for controlling simulated components of the experimental system 141 may include, for example, virtual commands, software function calls, and script commands for configuring the simulated components of the experimental system 141.

In some implementations, the deployment evaluator & controller 148 can output refined goals 118 to provide to the goals database 112. The refined goals 118 can include adjustments to the TPP 132 and the SAC 134. Generally, the refined goals 118 can represent fine-tuning of goals based on a current performance of the fitness engine 120. In further detail, if the deployment evaluator & controller 148 determines the differences of system behavior identified by the live system behavior model 142 and the experimental system behavior model 144 is outside a threshold amount, the deployment evaluator & controller 148 can revise the TPP 132 and subsequently the SAC 134.

In some cases, the cloud-computing server 110 may determine the goals identified by the defined goals 114 may not be obtainable by the fitness engine 120. The fitness engine 120 may perform simulations for an extended period of time or a time that exceeds a threshold amount of time without meeting the defined goals 114. In response, the cloud-computing server 110 can produce refined goals 118 to provide to the goals database 112. The cloud-computing server 110 can provide refined goals 118 that reduce the criteria set by the defined goals 114 in the event the goals are not obtainable.

In some cases, the fitness engine 120 may perform simulations that produce results that meet the defined goals 114 within a threshold amount of time. In response, the cloud-computing server 110 can produce refined goals 118 to provide to the goals database 112. The cloud-computing server 110 can provide refined goals 118 that improve the criteria set by the defined goals 114 should the produced results meet the defined goals 114 within the threshold amount of time.

In some examples, the deployment evaluator & controller 148 can indicate to the goal decomposition engine 126 to adjust various sensitivities of the sensitivity model 129 and one or more libraries of the goal traceability library model 133 in response to revising the TPP 132 and subsequently the SAC 134. In particular, the deployment evaluator & controller 148 can adjust a particular flow, adjust a component utilized in the SAC 134, adjust how two or more components defined by the SAC 134 communicate with one another, and/or adjust a trace sequence between the components defined by the SAC 134. Other examples are also possible.

The deployment evaluator & controller 148 can provide the refined goals 118 to the goals database 112 to be used for subsequent iterations by the system 100 and its various components. In the subsequent iterations, the fitness engine 120 can utilize the refined goals 118 in an attempt to move the operations performed by the experimental system 141 and its corresponding output closer to a desired system output, e.g., and similarly move the operations performed by the live system 106 and its corresponding output closer to a desired system output. This process will be further described below.

In some implementations, the live system behavior model 142 can provide the live behavior 139 to the simulation experiment design engine 130. This is similarly shown in system 100 of FIG. 1A. The live behavior 139 can represent how the live system 106 responds to various contexts or practical situations in order to meet the desired customer criteria, e.g., TPP 132 and SAC 134. The simulation experiment design engine 130 can use the live behavior 139 generated by the live system behavior model 142 to generate a stimuli condition or context stimulus 138. The stimuli condition or context stimulus 138 can represent an event that occurs and is applied to the cloud-computing system. For example, the context stimulus 138 can include a user profile that accesses the cloud-computing system, a business event, a network outage condition, a delay condition due to a component malfunction, disconnection, or error, a security breach, a change in network load activity, a device accessing the cloud-computing system from a particular geographic location, a transaction being performed with the cloud-computing system, a historical trend, or another type of event, to name some examples. As will be described, the fitness engine 120 applies the context stimulus 138 to the experimental system 141 to simulate execution of the application as affected by the context stimulus 138.

In some implementations, the simulation experiment design engine 130 can include a failure & degradation modeler 160, a user profile extractor & modeler 161, an event extractor & modeler 162, a profile extractor & modeler 163, a perturbation extractor & modeler 164, and a fit-for-outcome experiment simulator 165. The simulation experiment design engine 130 can provide the live behavior 139 to each of the modelers 161 through 164. Each of the modelers may include one or more trained machine-learning models that are configured to produce a likelihood of which of the one or more context stimulus is identified in the live behavior 139. The one or more trained machine-learning models for each of the modelers 160 through 164 can be configured to identify various context stimulus in the live behavior 139.

If the modelers 160 through 164 detect such context stimulus in the live behavior 139, then modelers 160 through 164 can an output a flag that indicates such a detection.

In some examples, the live behavior 139 may indicate a failure in a network attached storage component while a user John attempts to access the live system 106. In this example, the failure & degradation modeler 160 and the profile extractor & modeler 163 can output a high likelihood, e.g., a value of 0.999, 1, or other, and the other modelers 161, 162, and 164 can output a low likelihood, e.g., a value of 0.001, 0, or other, to name some examples. In some examples, the live behavior 139 may indicate a network outage delay, a latency in component response, a configuration change of one of the components, or some other perturbation factor. In this example, the perturbation extractor and modeler 164 can output a high likelihood, e.g., a value of 0.999, 1, or other, and the other modelers 160 through 163 can output a low likelihood value.

In some implementations, the fit-for-outcome experiment simulator 165 is configured to produce a context stimulus 138 according to the data output by each of the modelers 160 through 164. In further detail, the fit-for-outcome experiment simulator 165 generates the context stimulus 138 so that the experimental system 141 can simulate the execution of the application on a particular cloud-computing system as affected by a context stimulus. This context stimulus 138 is the same context stimulus seen by the live system 106. In this manner, the fitness engine 120 can reproduce the context or conditions seen by the live system 106 and apply those same context or conditions to the experimental system 141. The experimental system 141 can then accurately simulate and/or reproduce the conditions by the live system 106 in order to accurately model and produce a cloud-computing system that more closely aligns to the customer criteria.

The fit-for-outcome experiment simulator 165 can receive as input the likelihoods from each of the modelers 160 through 164. Any of the likelihoods that satisfy a threshold value, e.g., match to or exceed the threshold value, can be utilized by the fit-for-outcome experiment simulator 165 to generate the context stimulus 138. For the likelihoods that do not satisfy the threshold value, the simulation experiment design engine 130 can discard those likelihoods.

In some examples, the fit-for-outcome experiment simulator 165 can generate the context stimulus 138 using the likelihoods that satisfy the threshold value from the modelers 160 through 164. The context stimulus 138 can include, for example, one or more of (i) failures and degradations should the corresponding modeler 160 produce a high likelihood, (ii) user profile accesses should the corresponding modeler 161 produce a high likelihood, (iii) event detections should the corresponding modeler 162 produce a high likelihood, (iv) other profile accesses should the corresponding modeler 163 produce a high likelihood, and (v) perturbation and disturbances should the corresponding modeler 164 produce a high likelihood. The context stimulus 138 can include data that simulates one or more of the events or contexts extracted from the live behavior 139, in an attempt to simulate conditions as seen by the live system 106.

In some examples, the context stimulus 138 can include various data components. These data components can include a specific time and a duration of one or more adverse events and a preceding state of the lab system 141, e.g., preceding state of lab controls 125. In this manner, the context stimulus 138 may indicate a network outage at 12:05 PM on May 1, 2023 for 10 minutes and another network outage at 1:10 PM on May 1, 2023 for 5 minutes. The context stimulus 138 can also vary an amount of network outage for one or more components of the lab system 141 and the preceding states of lab controls 125 prior to the network outages. Other examples of context stimulus and its various data components are also possible.

In some implementations, the fit-for-outcome experiment simulator 165 can simulate other context or conditions and apply the other context to the context stimulus 138. The other context can include, for example, varying user loads that access the cloud-computing system, varying user profiles that access the cloud-computing system, varying service flow rates, varying service flow types, and rogue vectors, e.g., intrusion. In some examples, the other context can include, for example, network outage/latency, introduce delays in component response, disconnect/shut down components, license/certification expirations, direct rogue vectors, configuration changes, malicious data injections, clock-sync disruptions, memory and cache faults, cluster quorum failures, and operation data loss. Other context can be applied to the context stimulus 138.

In some implementations, the fitness engine 120 can apply the context stimulus 138 as input to the experimental system 141. The experimental system 141 can include a simulated environment that can execute the application requested for in the query 104. In further detail, the simulated environment can initially include a cloud candidate computing system according to the TPP 132 and the SAC 134. The initial cloud candidate computing system can include a number of components, e.g., servers, virtual machines, and other devices, which acts as a starting point for a simulation of the application's execution. The fitness engine 120 can select a cloud candidate computing system to perform the simulation by matching the SAC 134 to one or more architecture components in the cloud candidate computing system. The fitness engine can identify a cloud candidate computing system that includes one or more architecture components that match to at least a portion of the SAC 134. In some examples, the experimental system 141 can select the identified cloud candidate computing system to execute the application in the generated simulated environment. Thus, the experimental system 141 can generate the simulated environment according to the identified cloud candidate computing system and execute the application in the generated simulated environment.

In some implementations, the experimental system 141 can apply the context stimulus 138 to generated simulated environment to affect the execution of the application. As the context stimulus 138 can match to the stimulus applied to the live system 106, the generated simulated environment can apply similar stimulus or context to its application execution. The context stimulus 138 can be applied to the application execution in the generated simulated environment to ensure the initial cloud architecture design is able to handle unexpected events during the real time processing of the application during its deployment in the live system 106.

As illustrated in FIG. 1A, the simulation experiment design engine 130 applies the context stimulus 138 to the experimental system 141. The experimental system 141 can initially select a cloud candidate computing system 140-1 from multiple cloud candidate computing systems 140 to host the generated simulated environment and can receive the lab controls 125.

In some examples, the experimental system 141 can perform one or more operations using (i) the lab controls 125, (ii) the cloud candidate computing system 140-1 hosting the generated simulated environment, and (iii) the context stimulus 138. In response, the experimental system 141 can output system data 156. The system data 156 can include, for example, output errors and failures, outage and availability of components in the cloud candidate computing system 140-1, transaction throughput during the duration of the one or more operations, and response times during the duration of the one or more operations. The system data 156 can also include internalized system data. The internalized system data can include, for example, resource saturation, resource utilization, resource costs, internal latency, internal throughput at various stages, and whether one or more security breaches occurred.

In some implementations, the experimental system 141 can iterate through each cloud candidate computing system of the multiple cloud candidate computing systems 140. In particular, the experimental system 141 can iterate through each of the cloud candidate computing systems using a single set of lab controls 125 and the context stimulus 138. In some examples, the experimental system 141 can iterate through simulations using each of the cloud candidate computing systems that match to components identified in the SAC 134. In this case, the experimental system 141 can generate system data 156 that includes system data for each of the identified cloud candidate computing systems. The experimental system 141 can provide the system data 156 that has been aggregated for each of the cloud candidate computing systems to the experimental system behavior model 144.

The experimental system 141 can iterate through each cloud candidate computing system until system data 156 falls within or satisfies the criteria identified by the TPP 132 and the SAC 134. Once a selected cloud candidate computing system and lab controls 125 are identified that satisfies the criteria identified by the TPP 132 and the SAC 134, the fitness engine 120 can select the cloud candidate computing system as the system to execute the application on the live system 106.

In some implementations, the cloud candidate computing systems 140 can include various combinations and sequences of software components and hardware components. These software components and hardware components can be spread over a cloud system and/or over an on-premises system. In this manner, the cloud-computing server 110 can analyze whether the application can be executed on an on-premises system, on a cloud system, or spread between an on-premises system and on a cloud system. Other examples are also possible.

Similarly, as illustrated in FIG. 1A, during stage (D), the fitness engine 120 can provide the live controls 124 and the selected cloud candidate computing system 140-1 to the live system 106. The live system 106 can configure its cloud-computing system according to the parameters to the selected cloud candidate computing system 140-1. Similarly, the live system 106 can configure the cloud candidate computing system 140-1 applied to the live system 106 using the live controls 124. The live system 106 can perform one or more operations using the applied selected cloud candidate computing system 140-1 and the live controls 124.

During stage (E), the live system 106 can generate runtime system data 122 in response to performing the one or more operations using the applied selected cloud candidate computing system 140-1 and the live controls 124. The runtime system data 122 can include similar data found in the system data 156 output by the experimental system 141 during the simulation. The live system 106 can provide the runtime system data 122 back to the fitness engine 120 for further processing.

Looking at FIG. 1B, the live system 106 can provide the runtime system data 122 back to the fitness engine 120 for further refinement. In particular, the live system 106 can provide the runtime system data 122 to the live system behavior model 142. Similarly, the experimental system 141 can provide the system data 156 to the experimental system behavior model 144, where the live system behavior model 142 and the experimental system behavior model 144 provide their outputs to the deployment evaluator & controller 148 for further refinement.

In some implementations, the experimental system behavior model 144 can analyze the output system data 156 from the experimental system 141 to determine a proximity to which the output system data 156 satisfies the TPP 132 and the SAC 134. The output system data 156 can include the aggregated system data from the operations performed by each of the candidate cloud-computing systems. Specifically, the experimental system behavior model 144 can identify which of the system data from the aggregated system data satisfies the TPP 132 and the SAC 134 according to a threshold, e.g., includes the lowest margin of error, and select the candidate cloud-computing system to utilize for the live system 106. In response, in the subsequent iteration of this processing, the fitness engine 120 can provide the selected candidate cloud-computing system to the live system 106. For example, as illustrated in FIG. 1A, the fitness engine 120 selected the candidate cloud-computing system 140-5 as the candidate cloud-computing system 140-5 to operate on the live system 106.

During stage (F), the fitness engine 120 can output the refined goals 118 to the goals database 112. As previously mentioned, the refined goals 118 can include adjustments to the TPP 132 and the SAC 134 according to the differences identified by the live system behavior model 142 and the experimental system behavior model 144. The refined goals 118 can be used for subsequent iterations by the system 100 in an attempt to move the operations performed by the experimental system 141 and its corresponding output closer to a desired system output.

In some implementations, the deployment evaluator & controller 148 may receive behavior data from the live system behavior model 142 and behavior data from the experimental system behavior model 144 prior to the system design and architecture engine 146 providing an architecture for deploying a particular architecture. In this instance, the deployment evaluator & controller 148 can transmit a request for a new architecture to the system design and architecture engine 146 in response to receiving the behavior data from one or more of the live system behavior models 142 and the experimental system behavior model 144.

The stem design and architecture engine 146 can receive the request and in response, transmit a request to the goals database 112 for the latest version of the TPP 132 and the SAC 134 for a particular user or client device 102. In response, the goals database 112 can provide the latest version of the TPP 132 and the SAC 134 to the system design and architecture engine 146, which subsequently generates an architecture according to the latest version of the TPP 132 and the SAC 134 retrieved from the goals database 112. The generated architecture is provided to the deployment evaluator & controller 148 for subsequent processing.

In some implementations, the cloud-computing server 110 and the live system 106 iteratively perform the stages (B) through (F) in response to receiving the query 104. The cloud-computing server 110 attempts to identify a candidate cloud-computing system and a set of live controls 124 that can execute the application, maintain tolerance and error rates within various thresholds in view of any of the desired context stimulus applied, and satisfy the TPP 132 and the SAC 134. In this manner, the cloud-computing server 110 can generate a live system 106 with a candidate computing system that can execute the application according to customer criteria and can continue to execute the application according to customer criteria in view of any context stimulus it faces.

Figure 1C:
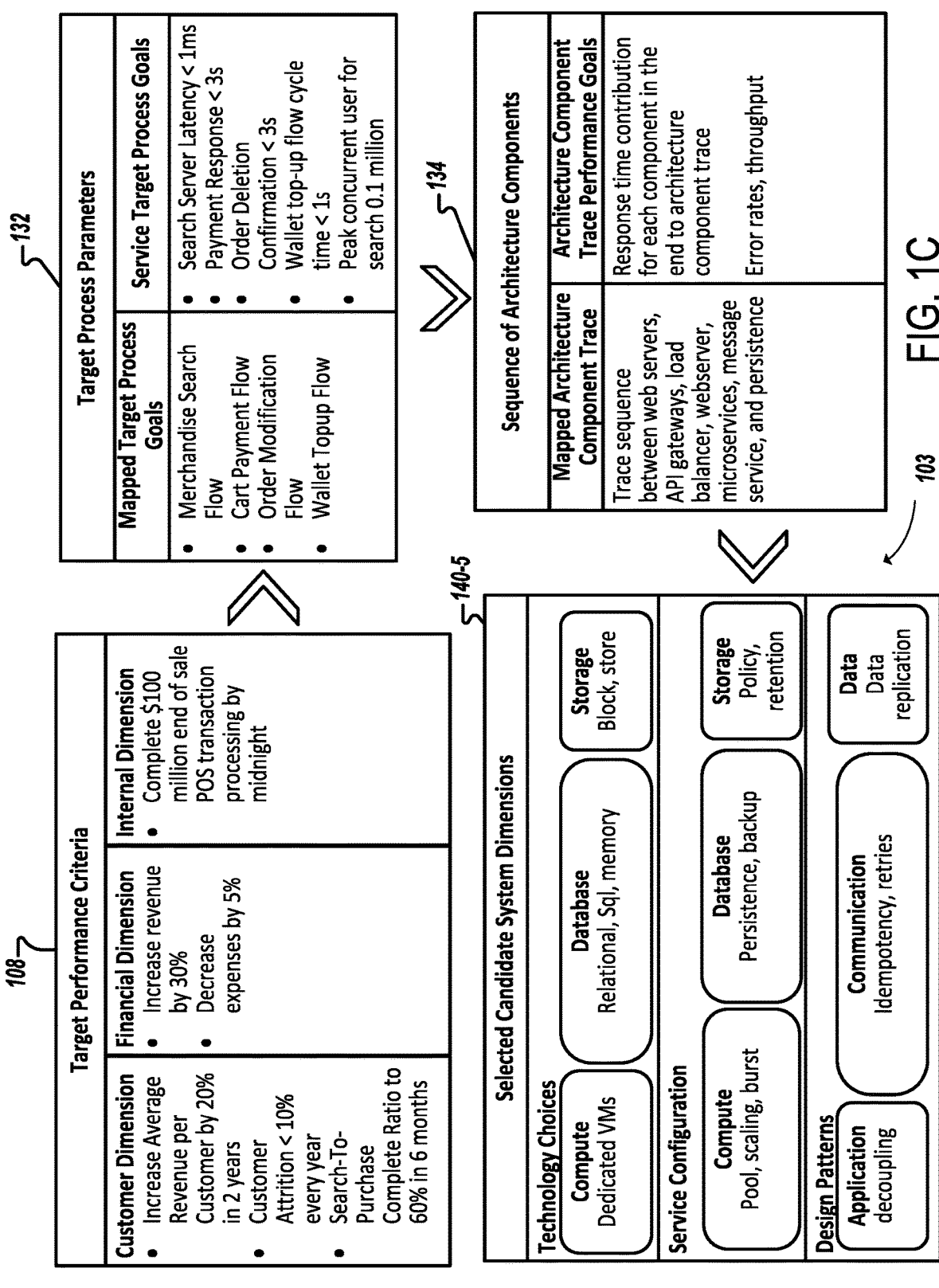
FIG. 1C is a diagram that illustrates example outputs from decomposing target performance criteria into target process parameters, a sequence of architecture components, and dimensions of a selected candidate system.

FIG. 1C is a diagram 103 that illustrates example output from decomposing target performance criteria 108 into target process parameters 132, a sequence of architecture components 134, and dimensions of a selected candidate cloud-computing system 140-5. The cloud-computing server 110 and the live system 106 of FIGS. 1A and 1B can process the target performance criteria 108, the target process parameters 132, the sequence of architecture components 134, and the selected candidate cloud-computing system 140-5.

In some implementations, the target performance criteria 108 can include performance criteria related to execution of an application for a customer, such as technical goals and business goals. For example, the target performance criteria 108 can include a customer dimension, a financial dimension, and an internal dimension. The customer dimension can include, for example, an increase average revenue per customer by 20% in 2 years, a customer attrition of less than 10% ever year, a search-to-purchase complete ratio to 60% in 6 months, a CART abandonment rate less than 20%, and a CSAT less than 75%. The financial dimension can include, for example, an increase in revenue by 30% and a decrease in expenses by 5%. The internal dimension can include, for example, a complete $100 million end of sale POS transaction processing by midnight. Other examples are also possible.

In some implementations, the target process parameters 132 can be decomposed or translated from the target performance criteria 108. The target process parameters 132 can include the processes to be performance for the target performance criteria 108. The processes can include various end-to-end flows of a specific task of the target performance criteria 108. For example, the target process parameters 132 can include mapped target process goals and service target process goals. In this example, the mapped target process goals can include merchandise search flow, cart payment flow, order modification flow, and wallet top-up flow. The service target process goals can include search server latency less than 1 ms, payment response less than 3 sec, order deletion confirmation less than 3 sec, wallet top-up flow cycle time less than 1 second, and peak concurrent user for search equivalent to 0.1 million.

In some implementations, the sequence of architecture components 134 can be decomposed or translated from the target process parameters 132. The sequence of architecture components 134 can include the processes and flows of data for the cloud-computing components of the live system to utilize during the execution of the requested application according to the target process parameters 132. For example, the sequence of architecture components 134 can include mapped architecture component trace and architecture component trace performance goals. In this example, the mapped architecture component trace can include a trace sequence between one or more web servers, API gateways, load balancer, webserver, microservices, message service, and persistence. The architecture component trace performance goals can include response time contribution for each component in the end to architecture component trace, error rates, and throughput.

In some implementations, the cloud-computing server 110 can iterate through various simulated candidate cloud-computing systems to identify a selected candidate cloud-computing system 140-5 that can execute the application on the live system according to customer criteria. The selected candidate cloud-computing system 140-5 can include various technology choices, various service configurations, and various design patterns.

The technology choices can be organized using a compute category, a database category, and a storage category. The compute category can include, for example, dedicated virtual machines (VMs), containerized systems, serverless systems, and use case optimized. The database category can include, for example, relational, NoSQL, in memory, document storage, transactional, warehouse, and graph. The storage category can include, for example, block, storage, file, and archival.

The various service configurations can be organized using a compute category, a database category, and a storage category. The compute category can include, for example, pooling, scaling, bursting, reservation, storage configuration, and load balancing. The database category can include, for example, persistence, backup, retrieval, read replica, high availability, burst, quotas, constraints, and indexing. The storage category can include, for example, policy, retention, throughputs, and durability.

The design patterns can be organized using an application category, a communication category, and a data category. The application category can include, for example, simplification, decoupling, redundancy, service degradation, immutable components. The communication category can include, for example, idempotency, retries, circuit breaker, bulkhead, publisher-subscriber, priority queueing (security), cache aside, throttling, and API design (platform independence/service evolution). The data category can include, for example, data replication, sharding, caching, redundancy (shared/local), data partitioning (horizontal/vertical/functional).

The cloud-computing server 110 and the live system 106 can use each of these aforementioned components of the target performance criteria 108, the TPP 132, the SAC 134, and the selected candidate cloud-computing system dimension 140-5 for processing. For example, the live system 106 can generate a cloud-computing system for executing the application using the components identified in the selected candidate cloud-computing system dimension 140-5.

Figure 1D:
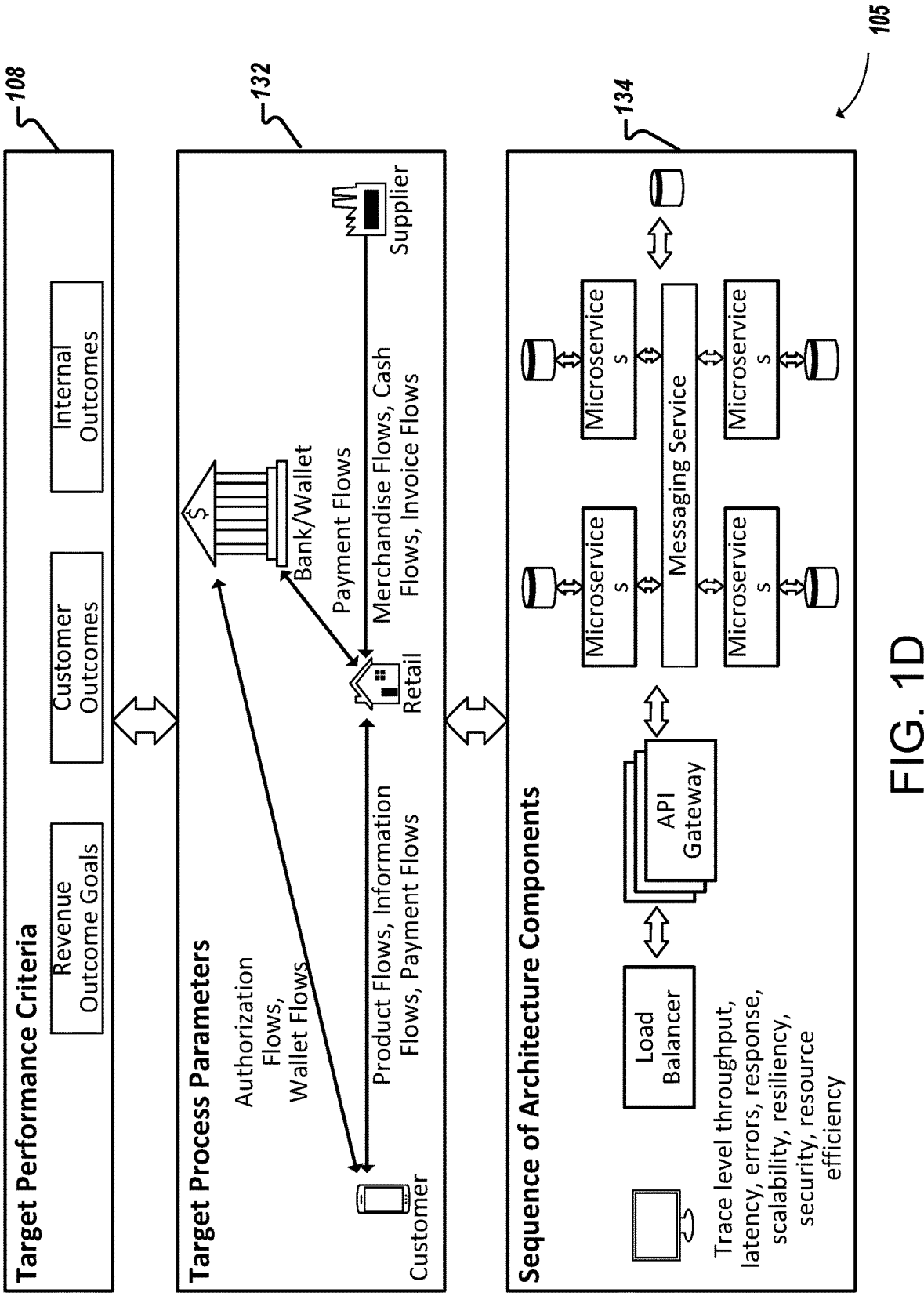
FIG. 1D is a diagram that illustrates example outputs from decomposing target performance criteria into target process parameters, and a sequence of architecture components.

FIG. 1D is a diagram 105 that illustrates example output from decomposing target performance criteria 108 into target process parameters 132, and a sequence of architecture components 134. In some examples, the target performance criteria 108 can include revenue outcome goals, customer outcomes, and internal outcomes. The target performance criteria 108 can include technical outcomes in addition to business outcomes.

The cloud-computing server 110 can translate the target performance criteria 108 into the target process parameters 132. In some examples, the target process parameters 132 can define, for example, authorization flows and wallet flows between a customer's client device and a bank. The parameters 132 can define, for example, product flow, information flows, and payment flows between a customer's client device and a retail business, e.g., related to payments of a product sold by the retail business. The parameters 132 can define, for example, payment flows between a retail business and a bank. The parameters 132 can define, for example, merchandise flows, cash flows, and invoice flows between a retail business and a supplier.

The cloud-computing server 110 can translate the target process parameters 132 into the sequence of architecture components 134. In some examples, the diagram 105 illustrates the sequence of architecture components 134 with a trace through a load balancer, an API gateway, multiple microservices, a messaging service, and various databases. The traces can represent a pathway between any of these components for performing a particular function associated with executing an application. Moreover, each stage of the trace can be analyzed according to, for example, a level throughput, latency, errors, response scalability, resiliency, security, and resource efficiency, to name some examples.

Figure 2:
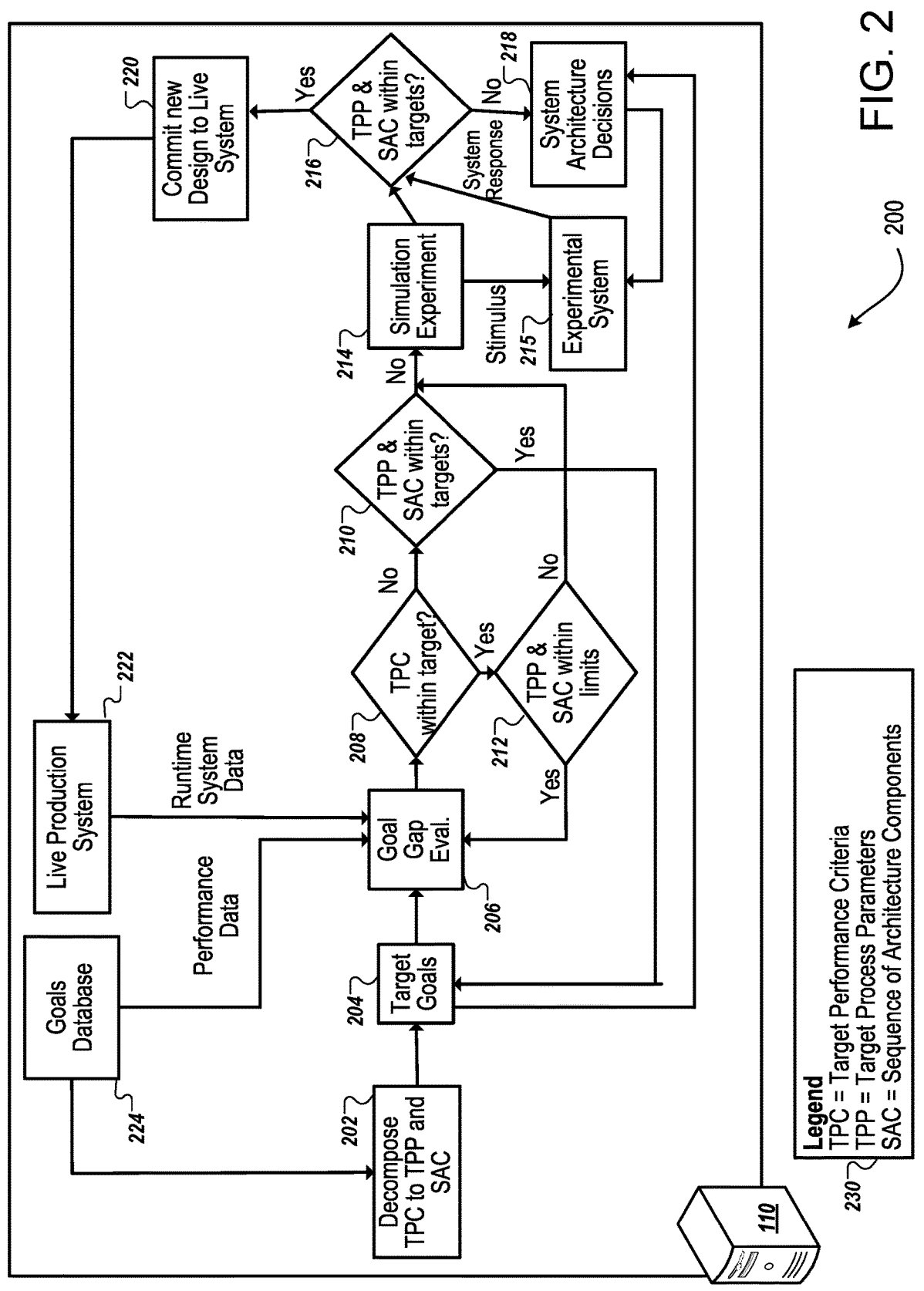
FIG. 2 is a flow diagram that illustrates an example of a process for identifying a cloud computing system architecture for a particular application or applications in accordance with particular performance criteria.

FIG. 2 is a flow diagram that illustrates an example of a process 200 for generating a cloud-computing system architecture according to customer criteria. The cloud-computing server 110 and specifically, the components of the fitness engine 120 can perform the process 200.

During 202, the cloud-computing server ingests target performance criteria (TPC) in three dimensions, for example. The three dimensions include customer, financial, and internal dimensions. The cloud-computing server translates the TPC into target process parameters (TPP) and subsequently translates the TPP into sequence of architecture components (SAC). The data identified in each of the TPC, TPP, and SAC is described in FIGS. 1A-1D.

During 204, the target goals are identified from the TPC, the TPP, and the SAC. The target goals can represent the goals utilized by the cloud-computing server to identify a candidate cloud-computing system and controls for the live system to execute the application according to the customer criteria. The cloud-computing server can store the target goals in the goals database for later retrieval.

During 206, the cloud-computing server can perform a continuous goal gap evaluation. In further detail, the cloud-computing server can compare the target goals, e.g., TPC, TPP, and SAC, to the actual goals computed by the live system. In particular, the cloud-computing server can perform the processes described in stages (B) through (E) of FIGS. 1A and 1B to determine the actual goals identified from the live system. The cloud-computing server can compare the actual goals produced by the live system, according to their three dimensions, with the target values. The gap or the difference is computed and evaluated against acceptable gap tolerance set by the operator. The acceptable gap tolerance may be a tolerance, for example, which identifies acceptable levels of difference between the actual goals of the live system and the target goals.

During 208, the cloud-computing server determines whether the TPC goals are within the target, e.g., within the acceptable threshold level. If the cloud-computing server determines the TPC goals do satisfy the threshold, then during 212, the cloud-computing server determines whether the TPP and the SAC goals are within acceptable threshold limits. The cloud-computing server may determine whether all goals set at each layer of abstraction are met before proceeding.

If the cloud-computing server determines that the TPP and SAC goals are also met, then the cloud-computing server proceeds to the goal gap evaluation mode performed in 206. At this point, the cloud-computing server can attempt to enhance the system technical capabilities of the live system because the target goals have been met. In this case, the cloud-computing server can increase the goal targets. For example, the TPC goals may include an increase in revenue from $20 million to $30 million, the TPP goals may include a reduction in search server latency to less than 0.5 ms from 1 ms, and the SAC goals may include a reduction in response time contribution from 0.5 ms to 0.4 ms. Other examples are also possible. In this manner, the cloud-computing server iterates in a manner that continuously improves the live system's execution of the application with the candidate cloud-computing system.

Back to 208, if the cloud-computing server determines that the TPC goals do not satisfy the threshold, then in 210, the cloud-computing server determines whether the TPP and SAC satisfy the threshold. If the cloud-computing server determines the TPP and SAC goals satisfy the threshold, then the cloud-computing server returns to the target goals 204 as the system's technical capabilities can be enhanced. In this case, the target goals for each of the TPC, TPP, and the SAC can be increased. If the cloud-computing server determines the TPP and the SAC do not satisfy the thresholds, then the cloud-computing server proceeds to 214.

During 214, the cloud-computing server executes an experimental lab process that involves analyzing one or more candidate cloud-computing systems executing the application in view of context stimulus in a simulated environment. This process is described with respect to the description of FIGS. 1A and 1B. During 215, simulation experiment instructs the experimental system in 215 to produce a system response, e.g., system data 156 from FIG. 1B.

During 216, the cloud-computing server captures the TPP and SAC using the system response, computes temporal trends of the simulation and statistical performance of the simulation in view of the TPP and SAC goals. In further detail, the cloud-computing server determines whether the new TPP and SAC goals satisfy the threshold targets. If the cloud-computing server determines the new TPP and SAC goals from the experiments do not satisfy the threshold targets, then during 218, the system can analyze the behavior of the live system and the experimental system to generate a new architecture. This process is illustrated in FIG. 1B as the system data 156 and the system data 122 are provided to the experimental system behavior model 144 and the live system behavior model 142, respectively. The cloud-computing server designs a new architecture system, and the new architecture system is applied to the experimental system in 215. The simulation experiment supplies a new context stimulus to the experimental system and another simulation is performed. Processes 214, 215, 216, and 218 iterate until process 216 determines the TPP and SAC goals satisfy the threshold values.

If the TPP and SAC goals satisfy the threshold values, then the cloud-computing server generates fitness controls, e.g., fitness controls 136, which is committed to the live system. The cloud-computing server can supply to the live system the candidate cloud-computing system that represents the system architecture that created TPP and SAC goals that satisfied the threshold values in 216.

During 222, the live system executes the application using the supplied fitness controls and the candidate cloud-computing system. The output of the executed application from the live system is supplied to the goal gap evaluation in 206. Similarly, during 224, the goals database can provide performance data to the goal gap evaluation in 206 which represents the actual performance goals of the live system.

The process of 202 through 224 can repeat in an iterative manner to ensure the live system executes the application while meeting threshold limits of each of the TPC, the TPP, and the SAC goals. By performing the application's execution in a simulated cloud environment, the cloud-computing server can iterate to identify a candidate cloud-computing system that can operate on the live system without having to deploy a candidate cloud-computing system to test each iteration. Rather, the live system is configured to utilize the candidate cloud-computing system that most effectively executes the application according to customer criteria.

FIG. 3 is a flow diagram that illustrates an example of a process 300 for identifying a cloud-computing system for executing an application according to customer criteria. The cloud-computer server 110 and the live system 106 can perform the process 300.

The cloud-computing server can obtain a set of target performance criteria associated with an application executable at least in part on a cloud computing system (302). A user can provide a query from a client device to a live system, the live system communicating with the cloud-computing server. The query can include data identifying a particular application to be executed on the live system. In further detail, the query can describe the type of application to execute and data identifying target performance criteria associated with the execution of the application. The data identifying the target performance criteria can include, for example, business goals and technical goals related to the execution of the application.

The live system can utilize controls, instructions, and/or parameters from the cloud-computing server to execute the application identified in the query. However, in order for the cloud-computing server to provide controls, instructions, and/or parameters that enable the live system to execute the application identified in the query such that the results of the execution align with the target performance criteria, the cloud-computing server can analyze the target performance criteria to produce such controls. As such, the live system can extract the target performance criteria from the query and provide the target performance criteria to a goals database. The goals database can store the target performance criteria for storage and for future retrieval by both the live system and the cloud-computing server.

The cloud-computing server can receive the target performance criteria from the goals database. In some cases, the cloud-computing server can receive the target performance criteria directly from the live system. In some examples, the target performance criteria 108, which define criteria for executing the application on the cloud platform can indicate, in this example that the query requests for a 10% revenue increase per customer in the next 2 years while executing the application on the cloud-computing server over on-premise systems. The cloud-computing server can utilize a fitness engine that identifies, in an iterative manner, a cloud-computing architecture that meets the target performance criteria provided in the query. The fitness engine can decompose the target performance criteria into (i) a set of controls for executing the application on the live system and (ii) a particular cloud candidate system that the live system can utilize for executing the application on the live system.

The cloud-computing server can generate, using one or more machine learning models from the set of target performance criteria, a set of target process parameters related to one or more processes associated with execution of the application (304). In further detail, a goal decomposition engine of the fitness engine can include one or more machine learning models that are configured to produce, from the target performance criteria, (i) target process parameters and (ii) a sequence of architecture components. The target process parameters can represent the processes to be performed for the target performance criteria. The target process parameters can include various end-to-end flows of a specific task indicated by the target performance criteria, e.g., a business process, which can include for example, a user search, a trade order for a financial trade, or an invoice creation, to name some examples. In some examples, the various end-to-end flows of the target process parameters can include parameters that represent one or more of: throughput, latency, response time, error rates, fault tolerance, and data security.

The goal decomposition engine can utilize the one or more machine learning models to decompose the target process parameters to the sequence of architecture components. The architecture components can include one or more of: a web server, a virtual machine, an application programming interface (API) gateway, a local balancer, a storage component, or a database. The sequence of architecture components can represent a flow and/or process through the various architecture components that can be utilized by the live system to execute the requested application. In some examples, the sequence of architecture components can represent a combination of computational resources, database resources, and storage resources. In further detail, these architecture components can represent one or more policies associated with the execution of the application including one or more of: load balancing policies, data replication policies, data partitioning policies, or virtual machine policies.

The cloud-computing server can perform simulations of the execution of the application on respective ones of a plurality of candidate computing systems, wherein each candidate computing system includes a corresponding sequence of multiple architecture components at least a portion of which represents components of the cloud-computing system (306). The fitness engine can progressively iterate through architecture design choices to execute the application on the live using the target process parameters and the sequence of architecture components. The fitness engine can include a fitness design controller that can receive the target process parameters, the sequence of architecture components, runtime system data of the live system, and various defined performance. The runtime system data can include data that identifies states and outcomes of the live system. The defined performance can represent the current performance of the customer or business, such as a technical or business specification associated with the execution of the application.

In particular, the fitness engine can include a system design and architecture engine that can decompose the target process parameters and the sequence of architecture components into various components and policies for the architecture of the cloud-computing system. The various components and policies for the architecture of the cloud-computing system can be formulated into one or more structured formats, for example, textual data of the generated architecture, a tabulated format of the generated architecture, a visual graph of the generated architecture, and other types of descriptors representing the architecture. The data indicative of the generated architecture can include (i) the components included in the architecture, (ii) how each of the components included in the architecture communicate and connect with one another, (iii) functions performed by each of the components, and (iv) functions performed between each of the components. The system design and architecture engine can provide the data indicative of the generated architecture to a deployment evaluator & controller.

The deployment evaluator & controller use the data indicative of the generated architecture to generate fitness controls. The generated fitness controls can include separate controls for commanding and controlling the components of the live system and an experimental system. In further details, the generated fitness controls can include live controls for commanding and controlling the live system and can include lab controls for commanding and controlling the experimental system. The generated fitness controls can adjust the operation of both the experimental system and the live system to execute the application on the respective systems according to the target process parameters and the sequence of architecture components.

In some implementations, the fitness design controller can output data indicative of a live behavior to a simulation experiment design engine. The data indicative of the live behavior can represent how the live system responds to various contexts or practice situations in order to meet the desired customer criteria, e.g., the target process parameters and the sequence of architecture components. The simulation experiment design engine can use the live behavior generated by a live behavior model of the fitness design controller to generate a context stimulus. The context stimulus can represent an event that occurs and is applied to the cloud-computing system. For example, the context stimulus can include a user profile that accesses the cloud-computing system, a business event, a network outage condition, a delay condition due to a component malfunction, disconnection, or error, a security breach, a change in network load activity, a device accessing the cloud-computing system from a particular geographic location, a transaction being performed with the cloud-computing system, a historical trend, or another type of event, to name some examples. The fitness engine can apply the generated context stimulus to the experimental system to simulate execution of the application as affected by the context stimulus.

The simulation experiment design engine can include one or more models that can produce a likelihood of a corresponding context stimulus as identified from the live behavior. In response, the simulation experiment design engine can generate the context stimulus according to the data or likelihood output by one or more of the models as identified from the live behavior. In this manner, the fitness engine can reproduce the context or conditions seen by the live system and apply those same context or conditions to the experimental system. The experimental system can then accurately simulate and/or reproduce the conditions by the live system in order to accurately model and produce a cloud-computing system that more closely aligns to the customer criteria.

In some implementations, the experimental system can include a simulated environment that can execute the application requested in the query. In some examples, the simulated environment can execute the application using a cloud candidate computing system according to the target process performance and the sequence of architecture components. The cloud candidate computing system can include a number of components, e.g., servers, virtual machines, and other devices, which acts as a starting point for a simulation of the application's execution. The fitness engine can select a cloud candidate computing system to perform the simulation by matching the sequence of architecture components to one or more architecture components in the cloud candidate computing system. The fitness engine can identify a cloud candidate computing system that include one or more architecture components that match to at least a portion of the sequence of architecture components. In some examples, the experimental system can select an initial cloud candidate computing system to execute the application in the generated simulated environment.

The experimental system can apply the generated context stimulus to the generated simulated environment to affect the execution of the application using the identified candidate cloud computing system. As the context stimulus can match to the stimulus applied to the live system, the generated simulated environment can apply similar stimulus or context to its application execution. In some examples, the experimental system can perform one or more operations using (i) the lab controls, (ii) the identified cloud candidate computing system hosting the generated simulated environment, and (iii) the context stimulus. In response, the experimental system can output system data. The system data can include, for example, output errors and failures, outage and availability of components in the cloud candidate computing system, transaction throughput during the duration of the one or more operations, internalized system data, and response times during the duration of the one or more operations. The system data can be provided to the experimental system behavior model for analyzing the behavior of the simulated environment and for further refinement.

The cloud-computing server can select, based on results of the simulation, at least one of the candidate computing systems that satisfies the set of target process parameters (308). In some implementations, the fitness engine can iterate through the candidate cloud computing systems until the system data output by the experimental lab satisfies the criteria identified by the target process parameters and the sequence of architecture components. This process can be performed in an iterative manner, such that the results of the simulation are compared to the target process parameters and the sequence of architecture components for each cloud candidate computing system and against various context stimulus. In some examples, the results of the simulation that meet the criteria are used to provide the corresponding live controls and the selected cloud candidate computing system to the live system.

The cloud-computing server can provide instructions for deploying the selected computing system for execution of the application, the selected computing system being deployed at least in part on the cloud-computing system (310). Specifically, the fitness engine can provide (i) live controls that correspond to the lab controls that produced the simulation results that satisfies the criteria of the target process parameters and the sequence of architecture components and (ii) the selected cloud candidate computing system, to the live system. The live system can use the live controls and the selected cloud candidate computing system to perform one or more operations on at least a portion of the components in the live system. The live system can generate runtime system data in response to performing the one or more operations using the applied selected cloud candidate computing system and the live controls. The live system data is provided back to the fitness engine and further processing for refinement.

In some implementations, the live system can provide the runtime system data to the live system behavior model. Similarly, the experimental system behavior model of the fitness engine can analyze the output system data from the experimental system. The live system behavior model and the experimental behavior model can provide their respective outputs to the deployment evaluator & controller for further refinement of the fitness engine to identify a set of fitness controls and a candidate cloud computing system that satisfies the criteria of the target process parameters and the sequence of architecture components.

In some examples, the fitness engine may determine the runtime system data indicates that the execution of the application on the live system does not satisfy the target performance criteria. In response to determining the runtime system data does not satisfy the target performance criteria, the fitness engine can perform one or more or adjustments. These adjustments can include, for example, selecting a different cloud candidate computing architecture, adjusting the live controls, or creating a cloud candidate computing architecture to satisfy the criteria of the target process parameters and the sequence of architecture components for simulating. In response to performing simulations using these adjustments and determining the simulations satisfy the target process parameters and the sequence of architecture components, the fitness engine can provide the revised live controls and the created cloud candidate computing architecture to live system for execution of the application.

The cloud-computing server and the live system can iterate through (302)-(310) in response to receiving the query. In further detail, the cloud-computing server can, through the iterative process, attempt to identify a candidate cloud-computing system and a set of live controls that can execute the application, maintain tolerance and error rates within various thresholds in view of any of the desired context stimulus applied, and satisfy the target process parameters and the sequence of architecture components. In this manner, the cloud-computing server can generate a live system with a candidate computing system that can execute the application according to customer criteria and can continue to execute the application according to customer criteria in view of any context stimulus it faces.

In some implementations, the cloud-computing server can provide a notification to the client device of the user. The notification can indicate deployment of the set of live controls and the cloud candidate computing system to the live system. The notification can be provided each time the cloud-computing server deploys the set of live controls and the cloud candidate computing system to the live system.

Figure 4:
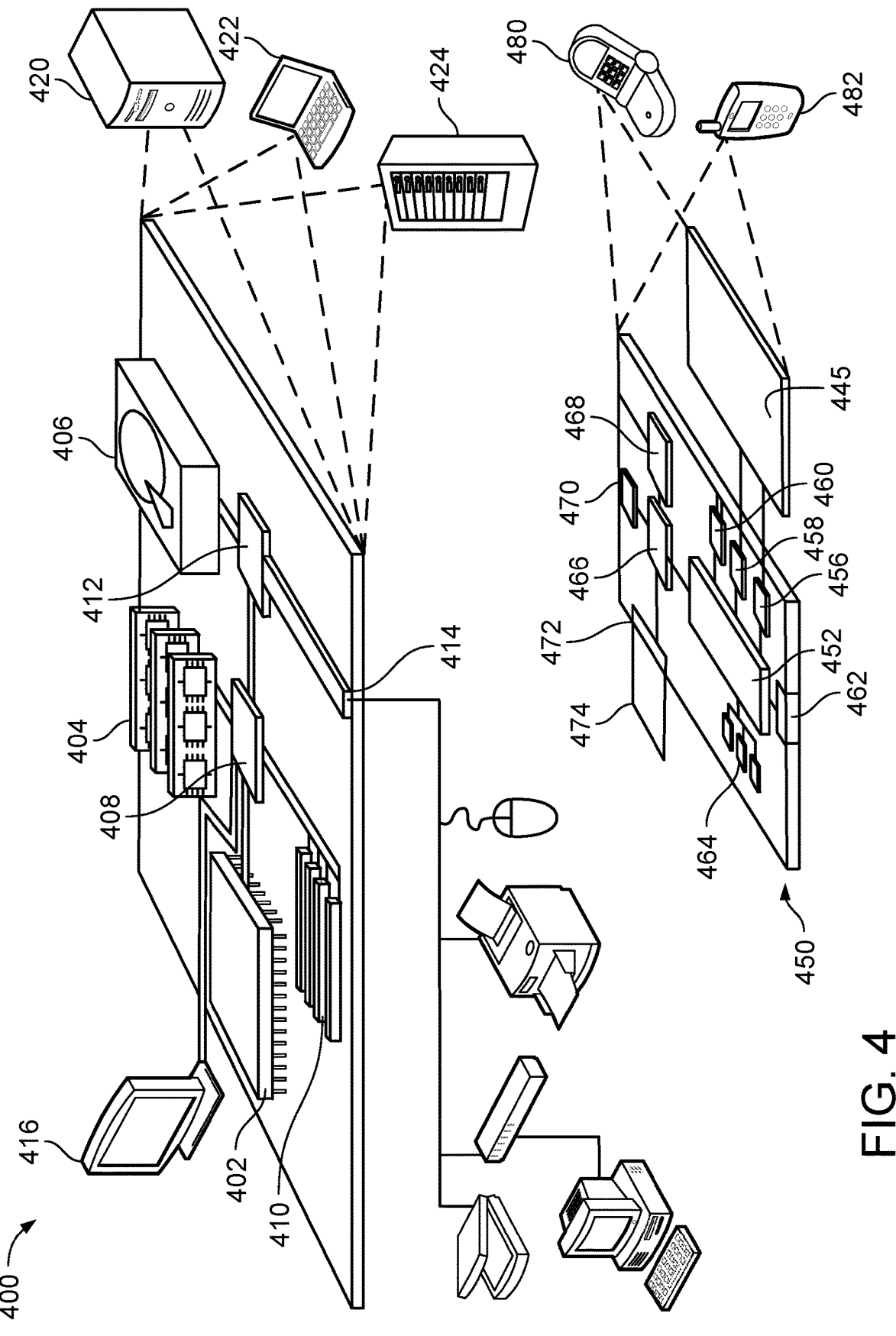
FIG. 4 shows a block diagram of a computing system that can be used in connection with methods described in this document.

FIG. 4 is a block diagram of computing devices 400, 450 that may be used to implement the systems and methods described in this document, either as a client or as a server or multiple servers. Computing device 400 and 450 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low-speed interface 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication, e.g., via a docking procedure, or for wireless communication, e.g., via Bluetooth or other such technologies.

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information. Thus, for example, expansion memory 474 may be provided as a security module for device 450 and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc., and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer implemented method comprising:
    obtaining, at one or more processing devices, a set of target performance criteria associated with an application executable at least in part on a cloud-computing system;
    generating, using one or more machine-learning models from the set of target performance criteria, a set of target process parameters related to one or more processes associated with execution of the application;

performing simulations, by the one or more processing devices, of the execution of the application on respective ones of a plurality of candidate computing systems, wherein each candidate computing system includes a corresponding sequence of multiple architecture components at least a portion of which represents components of the cloud-computing system, wherein performing the simulations comprises:
        identifying at least one candidate computing system from the plurality of candidate computing systems;
        generating a simulated environment based on the identified at least one candidate computing system;
        identifying, stimuli conditions associated with:
            the execution of the application within the generated simulated environment, and
            the identified at least one candidate computing system;
        providing the identified stimuli conditions to a simulation of the execution of the application by the identified at least one candidate computing system, within the generated simulated environment;
        performing simulation, by the one or more processing devices, of the execution of the application using the identified at least one candidate computing system, within the generated simulated environment; and
        generating the results of the simulation affected by the identified stimuli conditions;
    selecting, based on results of the simulations, the identified at least one of the candidate computing systems that satisfies the set of target process parameters; and
    providing instructions for deploying the selected at least one of the candidate computing system for execution of the application, the selected at least one of the candidate computing system being deployed at least in part on the cloud-computing system.

2. The computer-implemented method of claim 1, further comprising:
    receiving, at the one or more computing devices, information pertaining to execution of the application on the deployed at least one of the candidate computing system;
    determining, based on the information, that execution of the application on the deployed at least one of the candidate computing system does not satisfy the set of target performance criteria;
    responsive to determining that the execution of the application on the deployed at least one of the candidate computing system does not satisfy the set of target performance criteria, determining, by the one or more computing devices, adjustments to be made to the deployed at least one of the candidate computing system; and
    providing instructions for adjusting the deployed at least one of the candidate computing system.

3. The computer-implemented method of claim 2, wherein determining, by the one or more computing devices, adjustments to be made to the deployed at least one of the candidate computing system comprises:
    creating a candidate computing architecture to satisfy the set of target performance criteria, wherein the created computing architecture is included into a sequence of multiple architectures corresponding to the deployed at least one candidate computing system.

4. The computer-implemented method of claim 1, wherein the set of target process parameters include parameters representing one or more of: throughput, latency, response time, error rates, fault tolerance, or data security.

5. The computer-implemented method of claim 1, wherein the multiple architecture components include one or more of: a web server, a virtual machine, an application programming interface (API) gateway, a load balancer, a storage component, or a database.

6. The computer-implemented method of claim 1, wherein the multiple architecture components represent a combination of computational resources, database resources, and storage resources.

7. The computer implemented method of claim 6, wherein the multiple architecture components are representative of one or more policies associated with the execution of the application, including one or more of: load balancing policies, data replication policies, data partitioning policies, or virtual machine policies.

8. The computer-implemented method of claim 1, wherein the stimuli conditions include one or more of: network outage conditions, delay conditions due to a component malfunction or disconnection, configuration changes, security breaches, or load changes.

9. The computer implemented method of claim 1, wherein providing the instructions for deploying the selected computing system for execution of the application comprises:

providing instructions for selecting portions of the cloud-computing system for deploying at least a portion of the selected at least one candidate computing system; and providing, to a client device, a notification indicating deployment of the selected at least one candidate computing system for executing the application.

10. The computer-implemented method of claim 1, further comprising:

decomposing the set of target performance criteria, using the one or more machine-learning models, into the set of target process parameters and the sequence of multiple architecture components corresponding to each of the candidate computing system of the plurality of candidate computing system.

11. A system comprising:

one or more computers and one or more storage devices storing instructions that are operable, when executed by the one or more computers, to cause the one or more computers to perform operations comprising:

obtaining, at one or more processing devices, a set of target performance criteria associated with an application executable at least in part on a cloud-computing system;

generating, using one or more machine-learning models from the set of target performance criteria, a set of target process parameters related to one or more processes associated with execution of the application;

performing simulations, by the one or more processing devices, of the execution of the application on respective ones of a plurality of candidate computing systems, wherein each candidate computing system includes a corresponding sequence of multiple architecture components at least a portion of which represents components of the cloud-computing system, wherein performing the simulations comprises:

identifying at least one candidate computing system from the plurality of candidate computing systems;

generating a simulated environment associated with the identified at least one candidate computing system;

identifying, stimuli conditions associated with:

the execution of the application within the generated simulated environment, and the identified at least one candidate computing system;

providing the identified stimuli conditions to a simulation of the execution of the application by the identified at least one candidate computing system, within the generated simulated environment;

performing simulation, by the one or more processing devices, of the execution of the application using the identified at least one candidate computing system, within the generated simulated environment; and generating the results of the simulation affected by the identified stimuli conditions;

selecting, based on results of the simulations, the identified at least one of the candidate computing systems that satisfies the set of target process parameters; and providing instructions for deploying the selected at least one of the candidate computing system for execution of the application, the selected at least one of the candidate computing system being deployed at least in part on the cloud-computing system.

12. The system of claim 11, further comprising:

receiving, at the one or more computing devices, information pertaining to execution of the application on the deployed at least one of the candidate computing system;

determining, based on the information, that execution of the application on the deployed at least one of the candidate computing system does not satisfy the set of target performance criteria;

responsive to determining that the execution of the application on the deployed at least one of the candidate computing system does not satisfy the set of target performance criteria, determining, by the one or more computing devices, adjustments to be made to the deployed at least one of the candidate computing system; and providing instructions for adjusting the deployed at least one of the candidate computing system.

13. The system of claim 12, wherein determining, by the one or more computing devices, adjustments to be made to the deployed at least one of the candidate computing system comprises:

creating a candidate computing architecture to satisfy the set of target performance criteria, wherein the created computing architecture is included into a sequence of multiple architectures corresponding to the deployed at least one candidate computing system.

14. The system of claim 11, wherein the set of target process parameters include parameters representing one or more of: throughput, latency, response time, error rates, fault tolerance, or data security.

15. The system of claim 11, wherein the multiple architecture components include one or more of: a web server, a virtual machine, an application programming interface (API) gateway, a load balancer, a storage component, or a database.

16. The system of claim 11, wherein the multiple architecture components represent a combination of computational resources, database resources, and storage resources.

17. The system of claim 16, wherein the multiple architecture components are representative of one or more policies associated with the execution of the application, including one or more of: load balancing policies, data replication policies, data partitioning policies, or virtual machine policies.

18. The system of claim 11, wherein the stimuli conditions include one or more of: network outage conditions, delay conditions due to a component malfunction or disconnection, configuration changes, security breaches, or load changes.

19. The system of claim 11, further comprising:

decomposing the set of target performance criteria, using the one or more machine-learning model, into the set of target process parameters and the sequence of multiple architecture components corresponding to each of the candidate computing system of the plurality of candidate computing system.

20. A non-transitory computer-readable medium storing software comprising instructions executable by one or more computers which, upon such execution, cause the one or more computers to perform operations comprising:

obtaining, at one or more processing devices, a set of target performance criteria associated with an application executable at least in part on a cloud-computing system;

generating, using one or more machine-learning models from the set of target performance criteria, a set of target process parameters related to one or more processes associated with execution of the application;

performing simulations, by the one or more processing devices, of the execution of the application on respective ones of a plurality of candidate computing systems, wherein each candidate computing system includes a corresponding sequence of multiple architecture components at least a portion of which represents components of the cloud-computing system, wherein performing the simulations comprises:

identifying at least one candidate computing system from the plurality of candidate computing systems;

generating a simulated environment based on the identified at least one candidate computing system;

identifying, stimuli conditions associated with:

the execution of the application within the generated simulated environment, and the identified at least one candidate computing system;

providing the identified stimuli conditions to a simulation of the execution of the application by the identified at least one candidate computing system, within the generated simulated environment;

performing simulation, by the one or more processing devices, of the execution of the application using the identified at least one candidate computing system, within the generated simulated environment; and generating the results of the simulation affected by the identified stimuli conditions;

selecting, based on results of the simulations, the identified at least one of the candidate computing systems that satisfies the set of target process parameters; and providing instructions for deploying the selected at least one of the candidate computing system for execution of the application, the selected at least one of the candidate computing system being deployed at least in part on the cloud-computing system.

* * * * *